United States Patent [19]
Tomassi et al.

[11] Patent Number: 5,606,707
[45] Date of Patent: Feb. 25, 1997

[54] REAL-TIME IMAGE PROCESSOR

[75] Inventors: Mark S. Tomassi, Orlando; Andrew P. Abercrombie, Winter Park, both of Fla.

[73] Assignee: Martin Marietta Corporation, Bethesda, Md.

[21] Appl. No.: 312,926

[22] Filed: Sep. 30, 1994

[51] Int. Cl.$^6$ .............................. G06F 3/14; G06F 3/05; G06F 13/10
[52] U.S. Cl. ........................... 395/800; 395/94; 358/474; 358/448
[58] Field of Search .............................. 395/800, 25, 21, 395/60, 94, 106, 250, 775, 375, 2.35, 62, 11, 81, 200.03, 312, 477, 421.1; 364/DIG. 1, DIG. 2, 726, 133, 413.19, 413.22; 382/162, 304, 303, 308, 302; 358/444, 474, 486, 404, 412, 413, 431, 466, 451, 448; 348/232, 26, 409, 416; 370/110.1

[56] References Cited

U.S. PATENT DOCUMENTS

| | | | |
|---|---|---|---|
| 4,445,137 | 4/1984 | Panofsky | 382/302 |
| 4,656,507 | 4/1987 | Greaves et al. | 348/26 |
| 4,718,091 | 1/1988 | Kobayashi et al. | 382/162 |
| 4,734,782 | 3/1988 | Maeshima | 358/466 |
| 4,739,401 | 4/1988 | Sacks et al. | 382/103 |
| 4,809,347 | 2/1989 | Nash et al. | 382/240 |
| 4,901,360 | 2/1990 | Shu et al. | 382/303 |
| 5,125,044 | 6/1992 | Nemoto et al. | 382/302 |
| 5,136,662 | 8/1992 | Maruyama et al. | 382/308 |
| 5,138,459 | 8/1992 | Roberts et al. | 348/232 |
| 5,179,530 | 1/1993 | Genusov et al. | 364/726 |
| 5,210,836 | 5/1993 | Childers et al. | 395/375 |
| 5,239,387 | 8/1993 | Stein et al. | 358/444 |
| 5,253,308 | 10/1993 | Johnson | 395/800 |
| 5,353,061 | 10/1994 | Rodriguez et al. | 348/409 |

*Primary Examiner*—Daniel H. Pan
*Attorney, Agent, or Firm*—Burns, Doane, Swecker & Mathis, L.L.P.

[57] ABSTRACT

A real-time image processor has three functional sections: an image manager, an image processor, and an instruction generator. The image processor may be an array of single-instruction multiple-data (SIMD) processing elements, for processing a subframe of sensor data. The instruction generator generates image processing commands for execution by the image processor. The image manager may be coupled to a plurality of sensors for simultaneously receiving streams of sensor data from the sensors, each stream constituting one or more image frames. When the image manager detects that a subframe of data has been received from a sensor, it loads that subframe into the image processor. Next, the image manager sends a message to the instruction generator, the message including a subframe ready indicator and an algorithm designator. In response, the instruction generator begins generating image processing commands that are determined by the algorithm designator. After the instruction generator has sent out the final image processing command for the designated algorithm, it notifies the image manager. In response, the image manager retrieves the processed image data from the image processor. Hit detection logic in the image manager identifies the location of processed data having predetermined values. The image manager can additionally use a reconstruction buffer to form a processed frame of data from separately processed subframes of data.

6 Claims, 23 Drawing Sheets

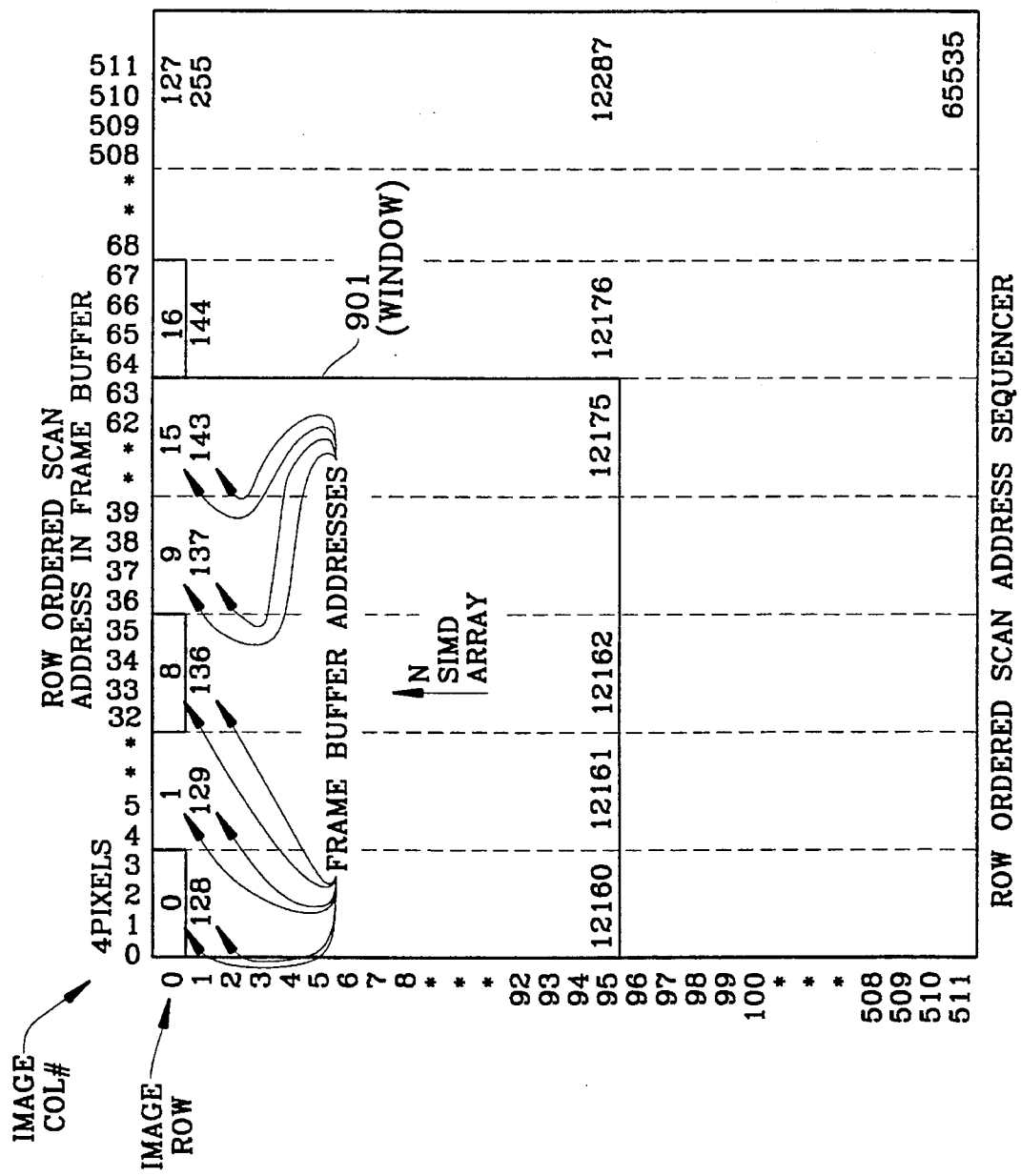

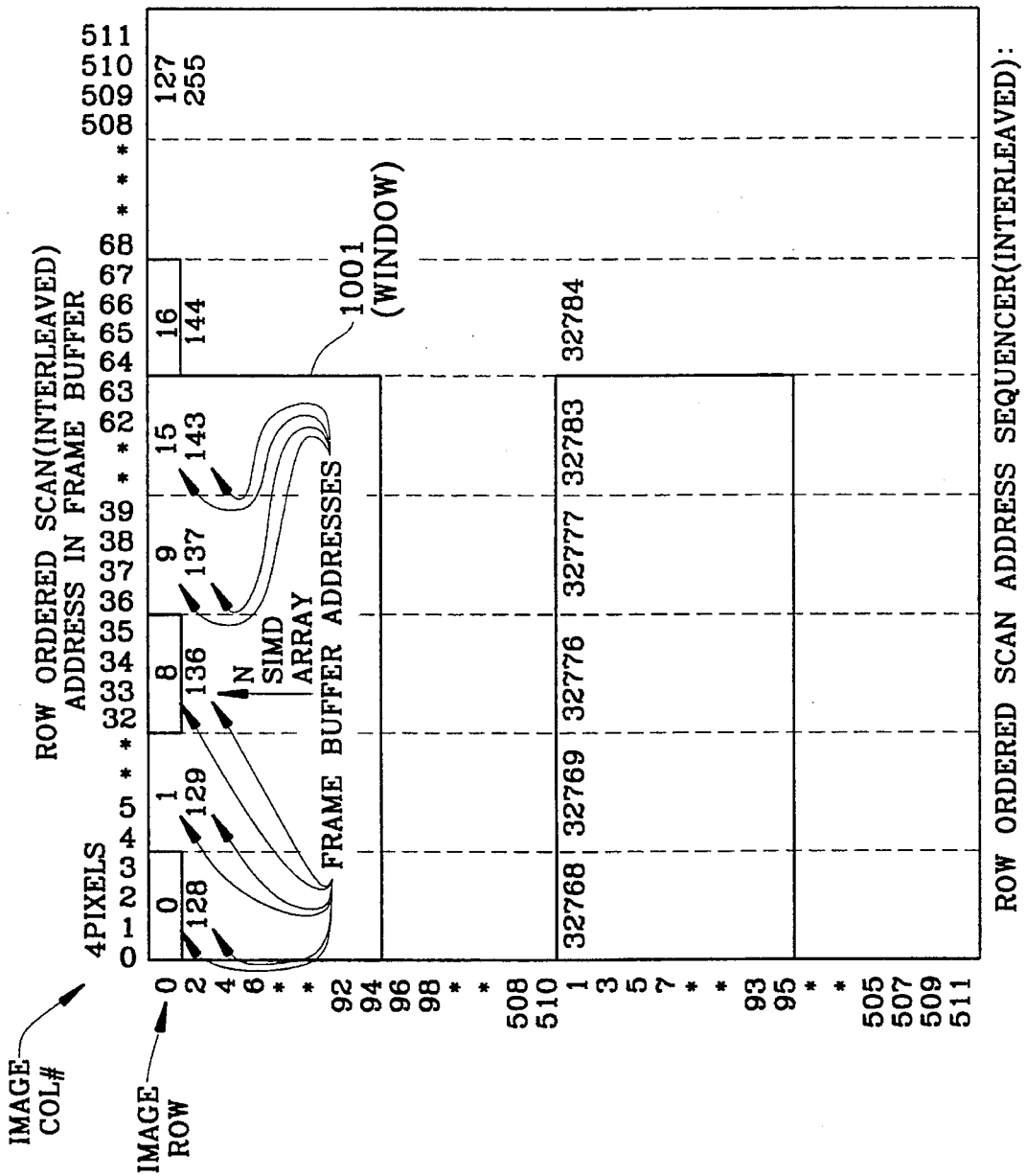

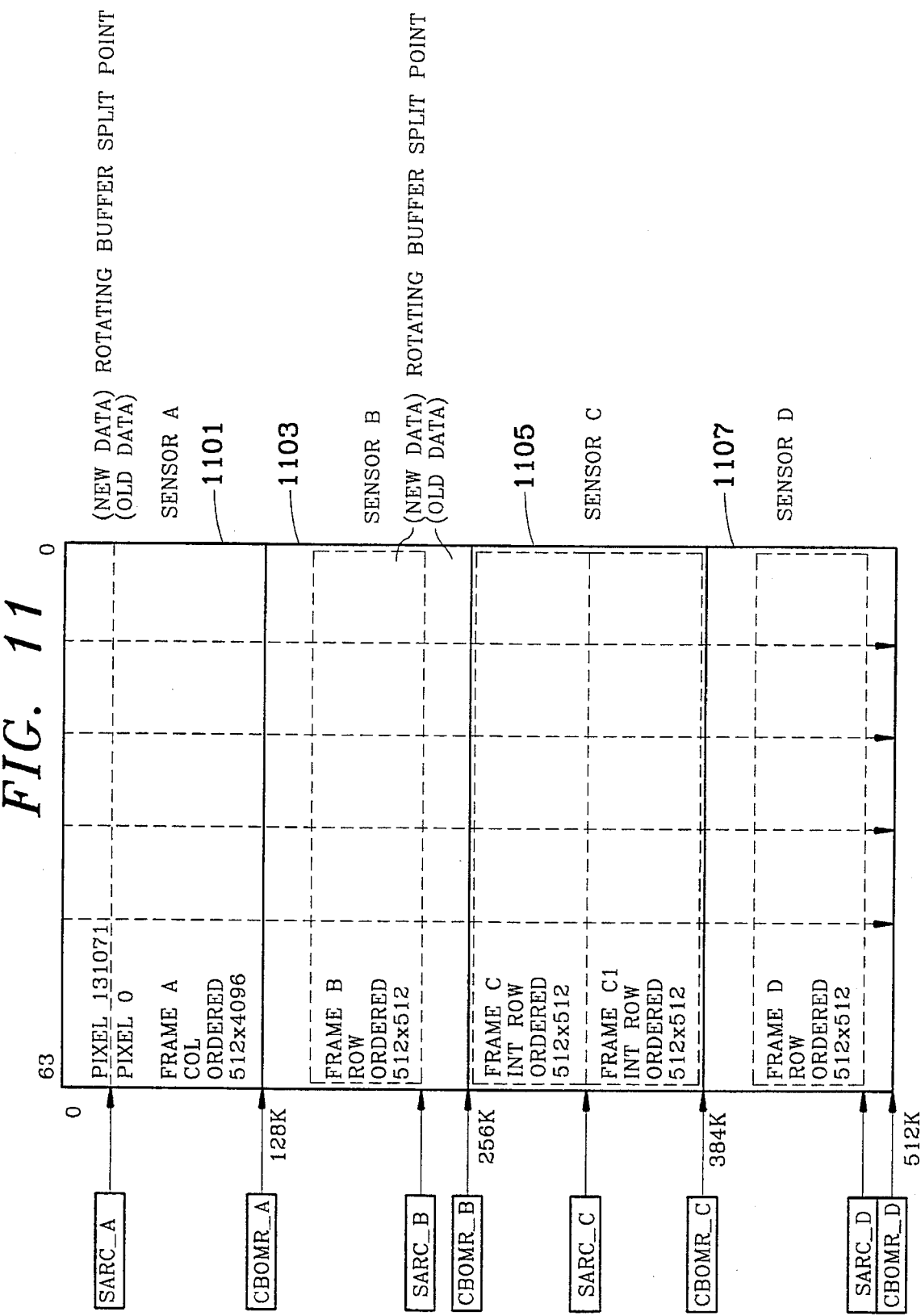

FIG. 13B

TIMING CHART FOR INPUT BUFFER LOGIC

-7  READ WORD FROM FRAME BUFFER INTO LOW (EX 0)
-6  READ WORD FROM FRAME BUFFER INTO HIGH (EX 8)

-5  READ WORD FROM FRAME BUFFER INTO LOW (EX 1)
-4  READ WORD FROM FRAME BUFFER INTO HIGH (EX 9)

-3  LATCH LOW AND HIGH MUX'ED DATA INTO MUX OUTPUT REGISTERS
    READ WORD FROM FRAME BUFFER INTO LOW (EX 2)
-2  LATCH MUX OUTPUT REGISTERS INTO PIXEL CORNERTURN REGISTER
-1  LATCH FIRST PIXEL PAIR INTO OUTPUT REGISTER
    READ WORD FROM FRAME BUFFER INTO HIGH (EX 10)

0   STORE FIRST PIXEL PAIR TO DP MEMORY
    LATCH SECOND PIXEL PAIR INTO OUTPUT REGISTER
    READ WORD FROM FRAME BUFFER INTO HIGH (EX 11,12,13,14,15,16)
1   STORE SECOND PIXEL PAIR TO DP MEMORY
    LATCH THIRD PIXEL PAIR INTO OUTPUT REGISTER
    LATCH LOW AND HIGH MUX'ED DATA INTO MUX OUTPUT REGISTERS
2   STORE THIRD PIXEL PAIR TO DP MEMORY
    LATCH FOURTH PIXEL PAIR INTO OUTPUT REGISTER
    LATCH MUX OUTPUT REGISTERS INTO PIXEL CORNERTURN REGISTER
3   STORE FOURTH PIXEL PAIR TO DP MEMORY
    LATCH FIRST PIXEL PAIR INTO OUTPUT REGISTER
    READ WORD FROM FRAME BUFFER INTO LOW (EX 3,4,5,6,7,8)
    GO TO STATE 0

TIME →

FIG. 14

| ADDRESS: | LOW | HIGH | | | | | | | | | | | | |
|---|---|---|---|---|---|---|---|---|---|---|---|---|---|---|
| 0 | 0,0 | 0,32 | 96 | 0,1 | 0,33 | * | * | * | 1536 | 0,16 | 0,48 | 2976 | 0,31 | 0,63 |
| 1 | 1,0 | 1,32 | 97 | 1,1 | 1,33 | * | * | * | 1537 | 1,16 | 1,48 | 2977 | 1,31 | 1,63 |
| 2 | 2,0 | 2,32 | 98 | 2,1 | 2,33 | * | * | * | 1538 | 2,16 | 2,48 | 2978 | 2,31 | 2,63 |
| 3 | 3,0 | 3,32 | 99 | 3,1 | 3,33 | * | * | * | 1539 | 3,16 | 3,48 | 2979 | 3,31 | 3,63 |
| 4 | 4,0 | 4,32 | 100 | 4,1 | 4,33 | * | * | * | 1540 | 4,16 | 4,48 | 2980 | 4,31 | 4,63 |
| * | * | * | * | * | * | * | * | * | * | * | * | * | * | * |
| * | * | * | * | * | * | * | * | * | * | * | * | * | * | * |
| * | * | * | * | * | * | * | * | * | * | * | * | * | * | * |
| 92 | 92,0 | 92,32 | 189 | 92,1 | 92,33 | * | * | * | 1628 | 92,16 | 92,48 | 3068 | 92,31 | 92,63 |
| 93 | 93,0 | 93,32 | 190 | 93,1 | 93,33 | * | * | * | 1629 | 93,16 | 93,48 | 3069 | 93,31 | 93,63 |
| 94 | 94,0 | 94,32 | 191 | 94,1 | 94,33 | * | * | * | 1630 | 94,16 | 94,48 | 3070 | 94,31 | 94,63 |
| 95 | 95,0 | 95,32 | 192 | 95,1 | 95,33 | * | * | * | 1631 | 95,16 | 95,48 | 3071 | 95,31 | 95,63 |

631

REAL-TIME IMAGE PROCESSOR

BACKGROUND

The present invention relates to a system for performing real-time processing of image data. More particularly, the invention relates to an architecture for such a system that provides a mechanism for supplying sensor data at a high rate of speed to an image processor, such as a single-instruction, multiple data (SIMD) parallel processor, and just as quickly retrieving the processed data from the image processor.

Various types of sensors are capable of producing large quantities of data signals (henceforth referred to simply as "data") that, when taken together, constitute an "image" of the sensed object or terrain. The term "image" is used broadly throughout this specification to refer not only to pictures produced by visible light, but also to any collection of data, from any type of sensor, that can be considered together to convey information about an object that has been sensed. In many applications, the object or terrain is sensed repeatedly, often at high speed, thereby creating many images constituting a voluminous amount of data. Very often, the image data needs to be processed in some way, in order to be useful for a particular application. While it is possible to perform this processing "off-line" (i.e., at a time after all of the data has been collected), the application that mandates the collection of image data may further require that the images be processed in "real-time", that is that the processing of the image data keep up with the rate at which it is collected from the sensor. Further complicating the image processing task is the fact that some applications require the sensing and real-time processing of images that are simultaneously collected from two or more sensors.

Examples of the need for high-speed image processing capability can be found in both military and civil applications. For example, future military weapon platforms will use diverse suites of high-data-rate infrared, imaging laser, television, and imaging radar sensors that require real-time automatic target detection, recognition, tracking, and automatic target handoff-to-weapons capabilities. Civil applications for form processing and optical character recognition, automatic fingerprint recognition, and geographic information systems are also being pursued by the government. Perhaps the greatest future use of real-time image processing will be in commercial applications like medical image enhancement and analysis, automated industrial inspection and assembly, video data compression, expansion, editing and processing, optical character reading, automated document processing, and many others.

Consequently, the need for real-time image processing is becoming a commonplace requirement in commercial and civil government markets as well in the traditional high-performance military applications. The challenge is to develop an affordable processor that can handle the tera-operations-per-second processing requirement needed for complex image processing algorithms and the very high data rates typical of video imagery.

One solution that has been applied to image processing applications with some success has been the use of high-performance digital signal processors (DSP), such as the Intel i860 or the Texas Instruments (TI) TMS320C40, which have architectures inspired by high-performance military vector processing algorithms, such as linear filters and the fast Fourier transform. However, traditional DSP architectural characteristics, such as floating point precision and concurrent multiply-accumulate (vector) hardware components, are less appropriate for image processing applications since they process with full precision whether it is needed or not.

New hardware architectures created specifically for image processing applications are beginning to emerge from the military aerospace community to satisfy the demanding requirements of civil and commercial image processing applications. Beyond the high input data rates and complex algorithms, the most unique characteristics of image processing applications are the two-dimensional image structures and the relatively low precision required to represent and process video data. Sensor input data precision is usually only 8 to 12 bits per pixel. Shape analysis edge operations can be accomplished with a single bit of computational precision. While it is possible that some other operations may require more than 12 bits, the average precision required is often 8 bits or less. These characteristics can be exploited to create hardware architectures that are very efficient for image processing.

Both hard-wired (i.e., algorithm designed-in hardware) and programmable image processing architectures have been tried. Because of the immaturity of image processing-algorithms, programmable image processing architectures (which, by definition, are more flexible than hard-wired approaches) are the most practical. These architectures include Single Instruction Single Data (SISD) uniprocessors, Multiple Data Multiple Instruction (MIMD) vector processors, and Single Instruction Multiple Data (SIMD) two-dimensional array processors.

Massively parallel SIMD operating architectures, having two-dimensional arrays of processing elements (PE), each operating on a small number of pixels, have rapidly matured over the last 10 years to become the most efficient architecture for high-performance image processing applications. These architectures exploit image processing's unique algorithm and data structure characteristics, and are therefore capable of providing the necessary tera-operation-per-second support to image processing algorithms at the lowest possible hardware cost.

The bit-serial design of most SIMD image processing architectures represents the logical and complete extension of the Reduced Instruction Set Computer (RISC) design concept. Where required by the algorithm suite, the SIMD bit serial PE is flexible enough to perform 1 bit or full precision floating point operations. In all cases, the highest possible implementation efficiencies are achieved because excess hardware in the SIMD architecture is never idle, in contrast to those solutions which employ DSP hardware for image processing. Two-dimensional SIMD image processing architectures also mirror the two-dimensional image data structures to achieve maximum interprocessor communication efficiency. These processors typically use direct nearest neighbor (i.e, north, south, east, and west) PE connections to form fine-grained, pixel-to-processor mapping between the computer architecture and the image data structure. The two-dimensional grid of interconnections provides two-dimensional SIMD architectures with inherent scalability. As the processing array is increased in size, the data bandwidth of the inter-PE bus (i.e, two-dimensional processor interconnect) increases naturally and linearly. An example of a SIMD architecture having the above-described characteristics is the one described in U.S. patent application Ser. No. 08/112,540, filed Aug. 27, 1993, entitled "Parallel Data Processor," which is commonly assigned to the assignee of the present application, and which is hereby incorporated by reference in its entirety. The Parallel Data Processor described in U.S. patent application Ser. No. 08/112,540 will henceforth be referred to as the "Geometric Arithmetic Parallel Processor (GAPP) IV."

While a SIMD architecture, such as the GAPP IV, makes available the raw processing power necessary to process image data in real-time, this capability is of little use if the processor is left idle whenever the surrounding hardware is either supplying image data to, or retrieving processed data from, the processor. Thus, it is necessary for the overall architecture of a real-time image processor to efficiently collect data from the sensors, supply it to the processing engine, and just as quickly move processed data out of the processing engine.

SUMMARY

It is therefore an object of the present invention to provide a real-time image processing architecture that is capable of quickly moving data into and out of an image processing engine in order to avoid clock cycles in which the image processing engine is idle.

It is a further object of the present invention to provide a real-time image processing architecture that allows an image processing engine to separately process portions of an entire image.

It is yet another object of the present invention to provide a real-time image processing architecture that allows processed portions of an image to be quickly reassembled into a whole processed image.

In accordance with one aspect of the present invention, the foregoing and other objects are achieved in an image processor comprising: image processing means for processing a subframe of a sensor image in accordance with image processing commands, the subframe constituting a predetermined quantity of sensor data; an instruction generator for generating the image processing commands in response to receipt of a message including a subframe ready indicator and an algorithm designator, the image processing commands being determined by the algorithm designator; and an image manager, coupled to the image processing means and the instruction generator means, and having an input for receiving a stream of sensor data constituting an image frame, the image frame comprising at least one subframe. In accordance with the invention, the image manager detects receipt of a subframe of sensor data, and in response thereto sends the subframe of sensor data to the image processing means, and sends a message to the image manager, the message comprising the subframe ready indicator, and the algorithm designator. Thus, it is possible for the image manager, in real-time, to quickly move subframes of data to the image processing means for processing, and to specify which algorithm is to be performed on that data.

In accordance with another aspect of the invention, in response to generating a final image processing command, the instruction generator sends a completion message to the image manager; and in response to receipt of the completion message, the image manager retrieves a processed subframe from the image processing means. Thus, the image manager can continue to control reception of data from one or more sensors while processing of a subframe of data is being performed in the image processing means. When notified of processing completion, the image manager can retrieve processed data.

In yet another aspect of the invention, the image manager further comprises an addressable output memory for storing the processed subframe; and hit detection logic for monitoring the processed subframe as it is being stored into the output memory, and for indicating output memory addresses of only those output memory locations into which were stored any of a plurality of predetermined data values. This feature provides a mechanism for the image manager to increase effective processing speed by eliminating the need for it to examine processed data which has been determined by the image processing algorithm not to contain data of interest. In this feature, the image processing algorithm generates a bit-plane of data, in which a data value equal to a predetermined value, such as "1", indicates that the corresponding pixel is of interest. The hit detection logic provides the image manager with addresses of only those processed pixels that have been designated as being of interest.

In accordance with still another aspect of the invention, the image manager further comprises bit extraction logic for receiving a multi-bit data value that is stored in a location of the output memory and for indicating a bit position of a most significant bit having a predetermined value in the multi-bit data value. This feature may be used in conjunction with the hit detection logic, when stored data contains more than one bit. The bit extraction logic quickly identifies which bit in a multi-bit value contains a predetermined value, thereby identifying the corresponding pixel of interest.

In accordance with another aspect of the invention, the image manager further comprises a reconstruction buffer; and the image manager places the processed subframe in a location of the reconstruction buffer in correspondence with a location that the subframe of data, from which the processed data was derived, corresponds to. This feature is useful for reconstructing an entire processed image from separately-processed subframes of image data.

In another aspect of this feature, the image manager, prior to placing the processed subframe into the reconstruction buffer, eliminates redundant pixels that were previously stored in the reconstruction buffer in connection with a previous processed subframe. This situation can occur when separately processed subframes of data overlap each other as required by some image processing algorithms.

BRIEF DESCRIPTION OF THE DRAWINGS

These and other objects and advantages of the invention will be understood by reading the following detailed description in conjunction with the drawings in which:

FIGS. 9(a)–(b) illustrate, respectively, the frame buffer data storage format for row oriented sensor data, and the order in which those pixels would be extracted from the frame buffer to read the window in accordance with the present invention;

FIGS. 10(a)–(b) illustrate, respectively, the frame buffer data storage format for interleaved-row oriented sensor data, and the order in which those pixels would be extracted from the frame buffer to read the window in accordance with the present invention;

FIG. 11 illustrates the storage arrangement, in the frame buffer, of images supplied by four sensors in accordance with the invention;

FIGS. 13(a)–(b) show a block diagram and a corresponding timing chart, respectively, of the register logic used by the window offset extractor and the pixel corner turn logic to perform aligned extraction in accordance with the invention;

FIG. 14 illustrates the sensor-independent pattern of data for a 64×96 SIMD processing array in accordance with the invention;

DETAILED DESCRIPTION

Figure 1:
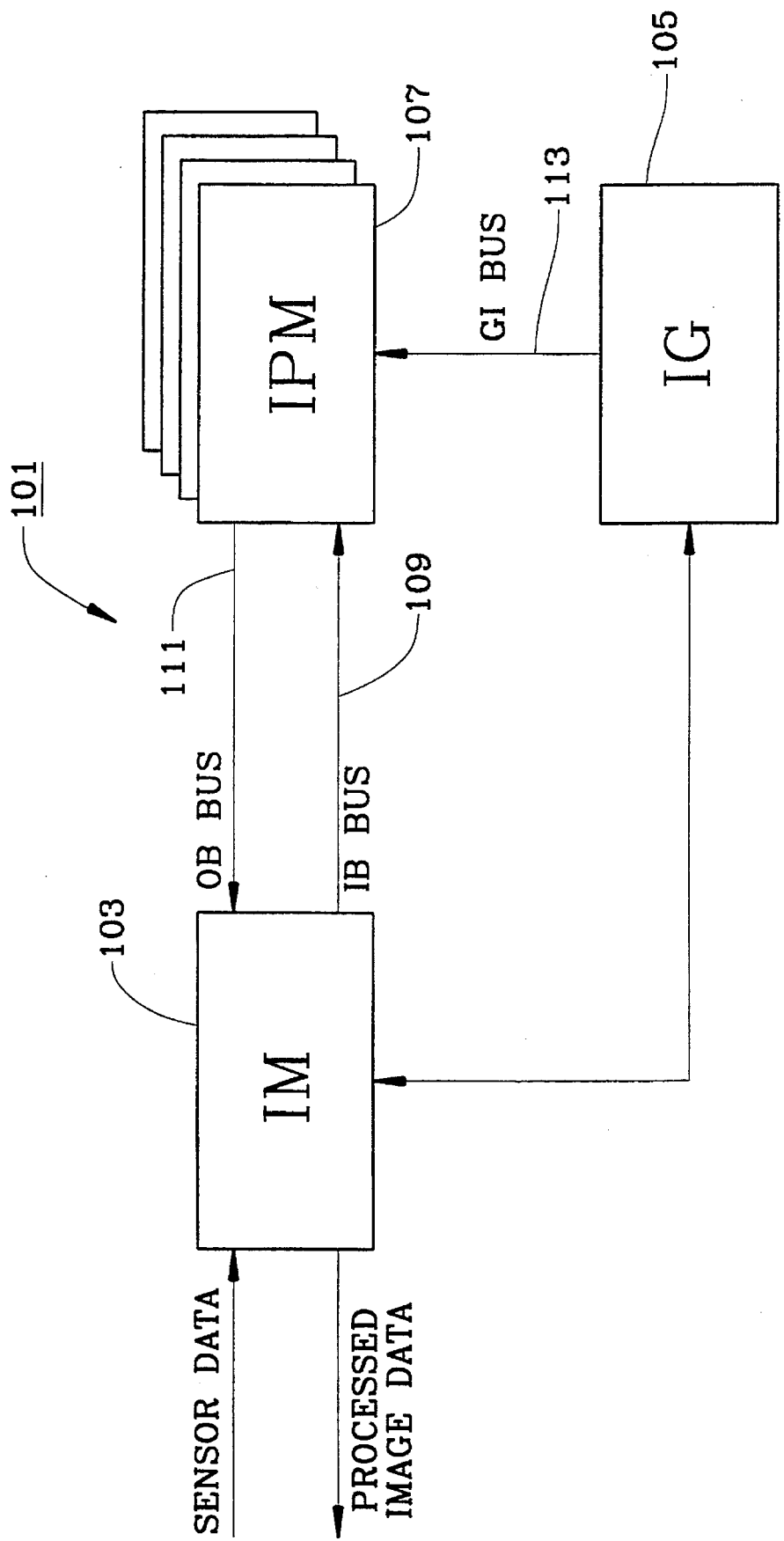
FIG. 1 is a block diagram of a real-time image processor 101 in accordance with a preferred embodiment of the present invention.

Referring to FIG. 1, a block diagram of a real-time image processor 101 in accordance with a preferred embodiment of the present invention is shown. The illustrated embodiment comprises three types of functional modules: at least one image processing module (IPM) 107, which is responsible for performing the "number crunching" operations on the image data; an image manager (IM) 103, which is responsible for receiving sensor data from one or more sensors, for moving that data to and from the IPM 107, and for controlling, at a high level, the processing that the IPM 107 will perform on the data; and an instruction generator (IG) 105, which is responsible for generating the low-level control signals that define the operation of the IPM 107 during each clock cycle. The architecture is expandable, and is preferably capable of supporting at least sixteen IPMs 107 per IG 105.

The three types of modules are coupled together by a number of dedicated buses. The IM 103 sends sensor data to the IPM 107 by means of the input buffer (IB) bus 109. The IPM 107 returns processed data to the IM 103 by means of the output buffer (OB) bus 111. The IG 105 sends low level instructions to the IPM 107 by means of the GI bus 113. These low level instructions control the clock-by-clock operations of the processing hardware on the IPM 107 as well as the movement of data into and out of the processing hardware located on the IPM 107. The following description describes the operation and preferred embodiments of these modules in more detail.

Figure 2:
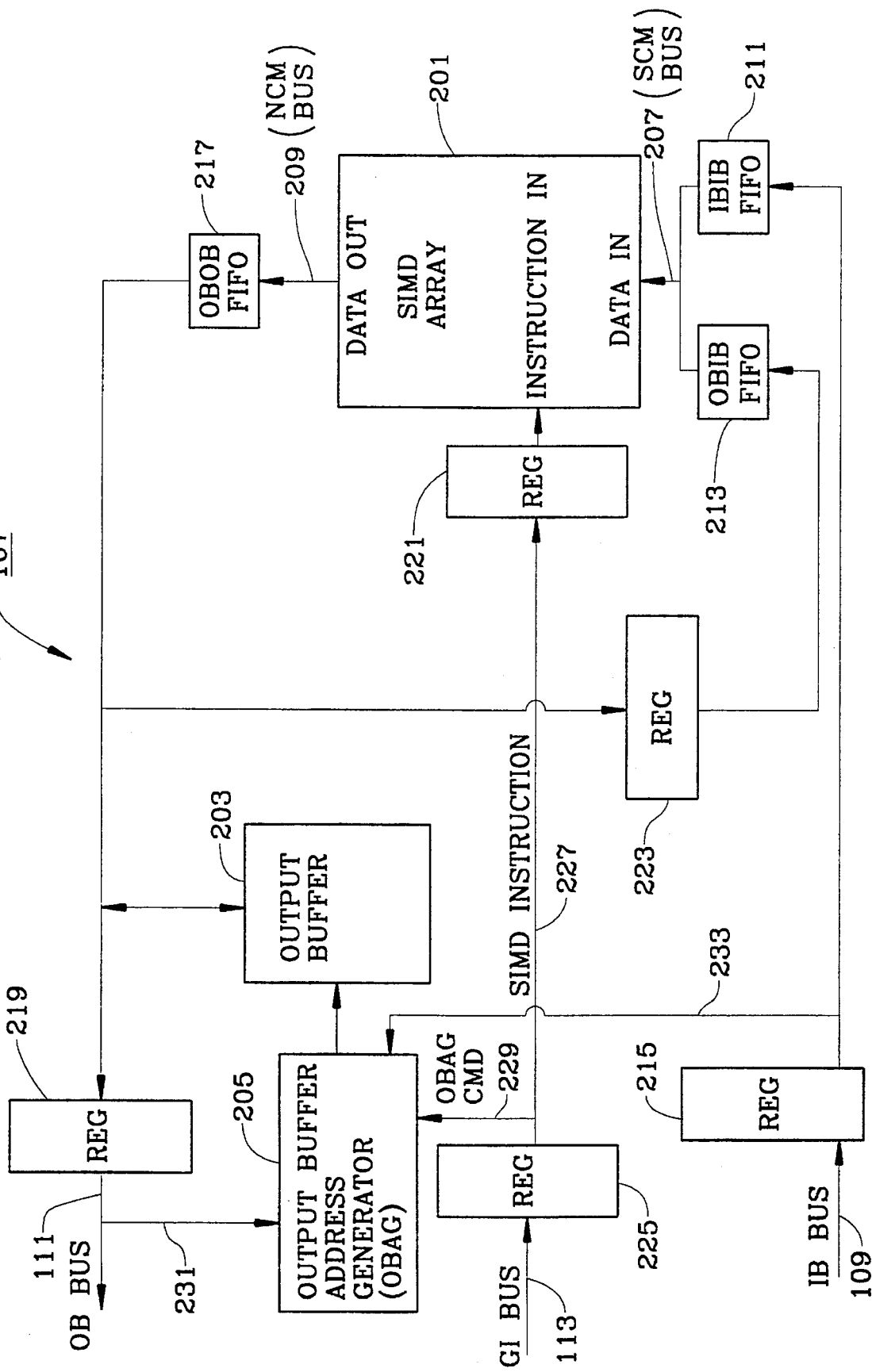
FIG. 2 is a block diagram of a preferred embodiment of an image processing module in accordance with the present invention.

FIG. 2 is a block diagram of a preferred embodiment of the IPM 107. (If the real-time image processor 101 includes more than one IPM 107, then each would take the form illustrated in FIG. 2.) The IPM 107 applies user-selected algorithms to the input image data in order to transform that input data into processed output image data. One may select, for the IPM 107, any of a number processing architectures, so long as it is capable of processing at speeds that are fast enough to satisfy user requirements, and so long as the selected architecture interfaces with the IM 103 and IG 105 as herein described. In a preferred embodiment (shown in FIG. 2), the IPM 107 includes a 64×96 SIMD array 201, an output buffer 203, and an output buffer address generator (OBAG) 205. Control instructions are supplied by the IG 105 to the IPM 107 through a register 225 that clocks in instructions from the GI bus 113. The format of each instruction may be such that a portion of the bits constitute a processor (SIMD) instruction 227, while the remaining bits constitute an OBAG command 229 relating to data movement between the SIMD array 201 and the output buffer 203 (described in more detail below). Where it is desirable to reduce the number of signals that are passed between the IG 105 and the IPM 107, the OBAG command 229 may be transmitted on lines that are otherwise used to convey parts of the processor instruction 227, such as memory addresses for the processor. Under these circumstances, the remainder of the processor instruction 227 should constitute a no-op command, to avoid erroneous processing results.

For controlling the movement of data from the output buffer 203 onto the OB bus 111, OBAG commands (such as those identifying a particular one of multiple IPMs 107) are received via the bidirectional OB bus 111 via path 231. Similarly, for identifying a particular one of multiple IPMs 107 for receipt of data from the IB bus 109, an OBAG command is sent on the IB bus 109 to the OBAG 205 via path 233.

The SIMD array 201 preferably comprises a 64×96 array of PEs, and in a preferred embodiment consists of an array of GAPP IV chips, each of which contains a two-dimensional array of 16×12 (=192 total) 1-bit serial processing elements (PEs) for a total of 192 1-bit serial PEs per GAPP IV chip. Each of the 192 PEs in a GAPP IV chip has a 192-bit local memory. Each GAPP IV chip uses a clock rate of 40 MHz, so that the entire 64×96 array of PEs is capable of operating at a rate of 245.8 billion instructions per second. The execution times and operations per second for a broad range of operations from boolean, 1-bit, and floating point primitives to large-area correlations are provided in Table 1. The clocks column shows how many bit-serial cycles are required to complete each higher-level operation over the full array extent.

TABLE 1

| Primitive | Clocks array-op | mixro-sec array-op | nano-sec Indiv-op | mega ops sec |
|---|---|---|---|---|
| Boolean (AND, OR, XOR, etc.) | 2 | 0.05 | 0.01 | 122,880 |
| 1 bit Compare (Edge Wrap, etc.) | 3 | 0.08 | 0.01 | 81,920 |
| 8 bit Add, Substract, Compare | 10 | 0.25 | 0.04 | 24,576 |
| 8 bit Multiply | 88 | 2.20 | 0.36 | 2,793 |
| 32 bit Floating Add | 909 | 22.73 | 3.70 | 270 |
| 32 bit Floating Multiply | 995 | 24.88 | 4.05 | 247 |
| 1 bit Dilate, Erode (4 neighbor) | 12 | 0.30 | 0.05 | 20,480 |
| 12 bit Dilate, Erode (4 neightbor) | 56 | 1.40 | 0.22 | 4,389 |
| Sobel Edge Magnitude & Direction | 228 | 5.70 | 0.93 | 1,078 |
| Radius 8 Blob Centroiding | 352 | 8.80 | 1.43 | 698 |
| 8 bit 8 × 8 Box Summation | 151 | 3.88 | 0.61 | 1,628 |
| 8 bit 32 × 32 Box Summation | 655 | 16.38 | 2.67 | 375 |
| 8 bit 3 × 3 Convolution | 540 | 13.50 | 2.20 | 455 |
| 8 bit 15 × 15 Convolution | 13,725 | 343.13 | 55.85 | 18 |
| 8 bit 9 × 9 Correlation | 6844 | 171.10 | 27.85 | 36 |
| 8 bit 17 × 17 Correlation | 24,661 | 541.53 | 88.14 | 11 |
| 1 bit 33 × 33 Correlation | 27,582 | 689.55 | 112.23 | 9 |

| | |
|---|---|
| Computational Memory | 1.2 Mega-bits (per module) |
| Computational Memory Bandwidth | 92.2 Giga-bytes/sec (per module) |
| Inter-processor I/O Bandwidth | 30.7 Giga-bytes/sec (per module) |
| System I/O Bandwidth | 50.0 Mega-pixels/sec (16 bits/pixel) |

Each PE in the SIMD array 201 preferably includes an arithmetic logic unit (ALU) that has parallel access to data stored in its local 192-bit RAM. That is, two RAM fetches and one store can be accomplished during each SIMD array instruction clock cycle. These memory accesses are required during the execution of an algorithm suite to enable each ALU to process the pixel data associated with a corresponding location in the image. Since the SIMD array 201 preferably comprises a 64×96 array of PEs, each IPM 107 contains 1.2 mega-bits of this working memory (i.e., (64× 96) PEs×192 bits/PE) and has access to it at an aggregate rate of over 90 giga-bits per second.

The 64×96 array of PEs in the SIMD array 201 are interconnected by north/south and east/west communications paths (the NS and EW buses, respectively) that provide for interprocessor working communications at a unidirectional sustained rate of 30.7 giga-bytes per second per IPM 107 (communications could be bidirectional). The east/west communications paths of the eastern-most and western-most PEs in the SIMD array 201 may be coupled to corresponding western-most and eastern-most PEs residing on additional IPMs 107, thereby providing a mechanism for scaling the size of the SIMD architecture in the real-time image processor 101. If I/O pin limitations permit, further scaling may be achieved by coupling north/south communications paths of the northern-most and southern-most PEs in the SIMD array 201 to corresponding southern-most and northern-most PEs residing on additional IPMs 107.

The SIMD array 201 also includes communications buses that link the array of PEs in the north-south direction. The south end of the communications bus (SCM bus) 207 is used for supplying raw image data to the SIMD array 201. The SCM bus 207 provides one bit of data to each of the southern-most PEs in the SIMD array 201, and is therefore 64 bits wide. Data is supplied to the SCM bus 207 from one of two FIFOs, which are designated the IBIB FIFO 211 and the OBIB FIFO 213. In the preferred embodiment, the IBIB FIFO 211 and OBIB FIFO 213 are "wire-OR'ed" together (only one of the IBIB and OBIB FIFOs 211, 213 are active at a time). The IBIB FIFO 211 is coupled to receive data from a clocked register 215, which in turn is coupled to receive data from the IB BUS 109. The OBIB FIFO 213 is coupled to receive register that originates in the output buffer 203. The IBIB FIFO 211 and the OBIB FIFO 213 each buffer image data, and preferably includes at least 4K×64 bits of storage.

The output of final or intermediate results from the SIMD array 201 is supplied from the 64 northern-most PEs to the north end of the communications bus (NCM bus) 209. The data on the NCM bus 209 is clocked into an OBOB FIFO 217, which preferably includes at least 4K×64 bits of storage. The output of the OBOB FIFO 217 may be clocked into the output buffer 203.

Because the SCM and NCM buses 207, 209 are independent from the above-described NS and EW buses, inputting raw image data, outputting processed image data, and algorithm (i.e., ALU) operations (including the movement of data from one PE to another within the SIMD array 201) can be performed in parallel during the same clock cycle. The rate of data transfer to the IPM 107 over the IB Bus 109 preferably matches the maximum input sensor data rate. In the illustrated embodiment, the IB Bus 109 may convey 50 million pixels-per-second, where each pixel is 16 bits wide.

The output buffer 203 is an addressable memory, preferably comprising at least 128K×64 bits of static RAM. The output buffer 203 receives all processed data from the SIMD array 201. If no further processing by the SIMD array 201 is to be performed on the data, it may be clocked into a register 219 for output onto the OB BUS 111. The IM 103 may then perform post-processing, if necessary. If the stored data represents only intermediate algorithm results, it may be transferred to the OBIB FIFO 213 by means of a clocked register 223. From the OBIB FIFO 213, the data may then be passed back to the SIMD array 201 for further processing. The access rate of the output buffer 203 is preferably at least 200 mega-bytes per second. Output data transfer from the SIMD array 201 is at a 100 mega-byte-per-second rate.

Figure 3:
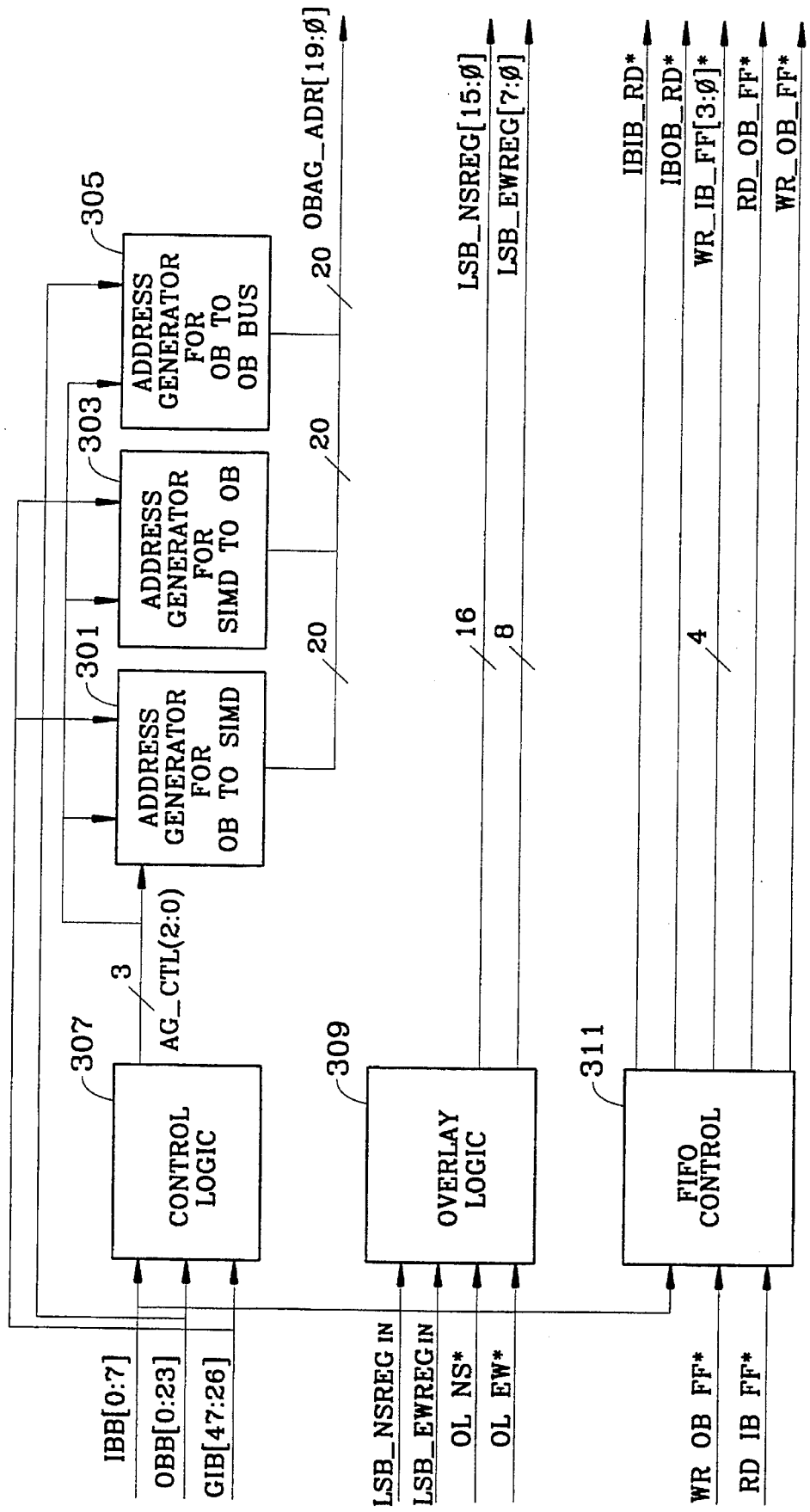
FIG. 3 is a block diagram of a output buffer address generator in accordance with the invention.

Addressing and control signals (i.e., chip select, write enable and output enable) for the output buffer 203 are provided by the OBAG 205, which will now be described with reference to FIG. 3. The OBAG 205 is responsive to OBAG commands 229, which are received from the GI bus 113 when the OBAG 205 is to move data from the SIMD array 201 to the output buffer 203 or vice versa. When data is to be moved from the output buffer to the IM 103, an instruction is received on the bidirectional OB bus 111. As mentioned above, the real-time processing system 101 may include a plurality of IPMs 107. In such a case, it is often necessary to control the operations of the IPMs 107 individually. For this purpose, the control logic 307 includes an IPM identification register (not shown). Within each IPM 107, this register is initialized from a unique value received on the GI bus 113. The loaded identification number is then utilized for selecting one IPM 107 from among many.

The OBAG 205 includes the hardware for four major functional areas: address generator logic 301–305, address generator control logic 307, overlay logic 309, and FIFO control logic 311.

The OBAG 205 has three address generators for providing three distinct means of output buffer 203 access: a first address generator 301 for output buffer to SIMD array accesses; a second address generator 303 for SIMD array to output buffer accesses; and a third address generator 305 for output buffer to OB bus accesses. The three address generators are prioritized, with the first address generator 301 having the highest priority, and the third address generator 305 having the lowest. Output buffer to SIMD array accesses are given highest priority because algorithm execution depends on having the correct data in the SIMD array 201 to continue execution and, therefore, it is necessary to place that data within the SIMD array 201 as soon as possible. The transfer of data from the output buffer 203 to the OB bus 111 is given lowest priority because this data movement is not as critical to keeping the SIMD array 201 busy.

The first, second and third address generators 301, 303, 305 support random accessing of the output buffer 203. The address generators 301, 303, 305 are initialized with a starting address, an offset to the next address, and the quantity of 64-bit words to be accessed. Once initialized, the OBAG 205 autonomously performs the appropriate action, address generation and output buffer access.

Figure 4:
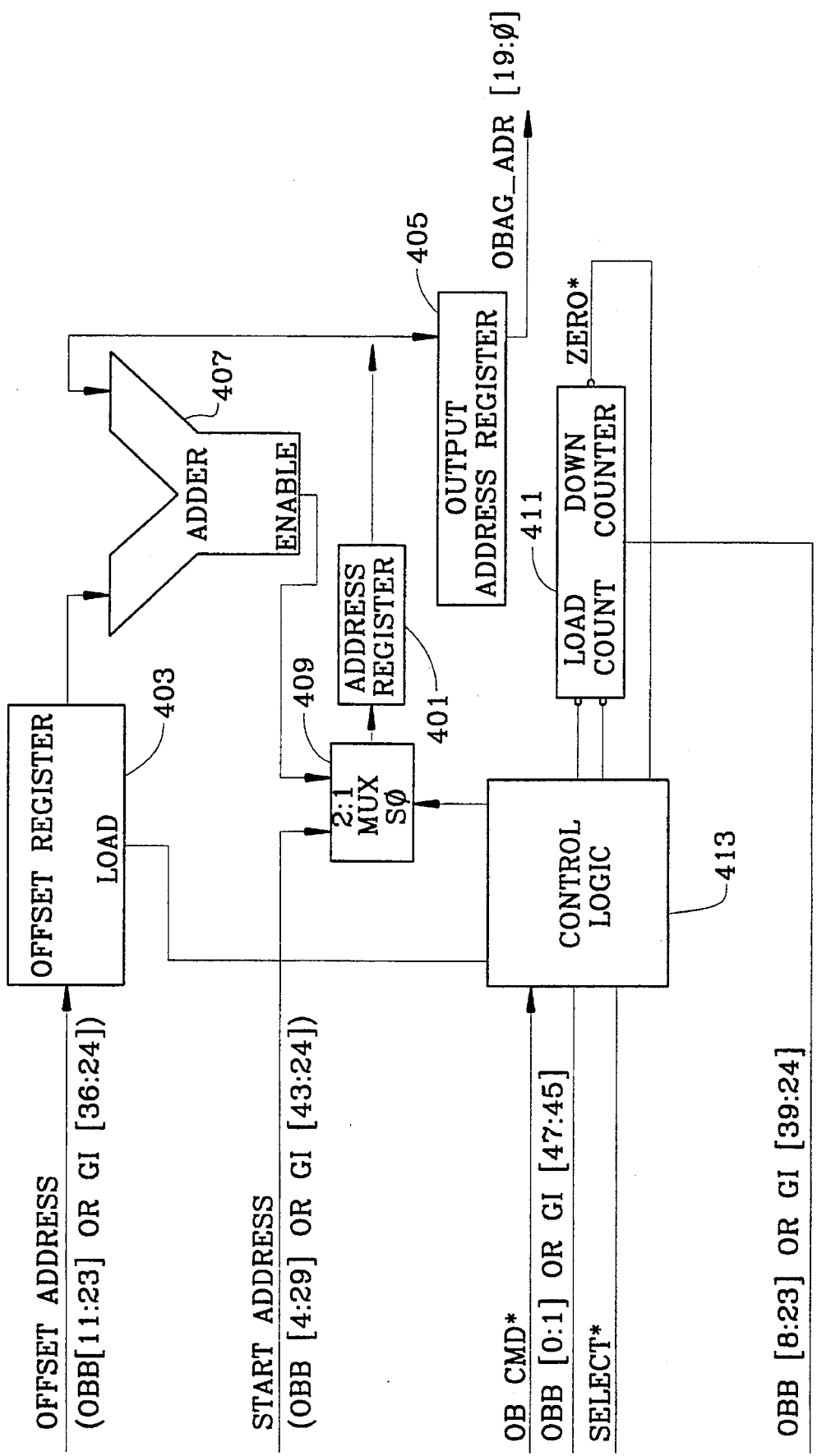
FIG. 4 is a block diagram of an embodiment of the first, second and third address generators used in an output buffer address generator in accordance with the invention.

Each of the first, second and third address generators 301, 303, 305 may have the architecture shown in FIG. 4. As shown in FIG. 4, an address generator includes an address register 401, an offset register 403, an output address generator 405, an adder 407, a 2:1 multiplexor 409, a down counter 411, and some combinatorial control logic 413.

The address generators 301, 303, 305 are loaded with three values in order to operate: an offset address, a length value, and a start address. In the exemplary embodiment, the offset address is 13 bits wide, permitting the offset address to be any number from 0 to 8191. The length value is 16 bits wide, which provides for 64K of addresses. The start address is 20 bits wide which produces a start address that may vary between 1 and 1 Meg. The start address is the last address supplied because immediately upon reception of the start address the address generator begins to produce addresses.

As previously mentioned, the three address generators are prioritized, with the first address generator 301 having the highest priority, and the third address generator 305 having the lowest. The protocol for accessing the address generators is as follows. First, the offset address is loaded into the offset register 403. Then the length is loaded into the down counter 411. The start address is then loaded into the address register 401, at which point address generation will start if the address generator has been selected. If a higher priority address generator has the address bus, then the address generator will hold off generating addresses until the bus is relinquished. If a higher priority access is requested while the bus is being accessed by a lower priority address generator, a clean stop will be executed and address generation for the new (higher priority) access will commence. After the higher priority access is completed, the old process will finish.

The address generator control logic 307 preferably comprises combinatorial logic and registers that perform the necessary task of decoding the protocol of the GI bus 113, the IB bus 109 and the OB bus 111, and selecting the appropriate one of the first, second and third address generators 301, 303, 307. The address generator also decodes and controls a toggle option. When the toggle option is enabled and the third address generator 305 is enabled along with either of the other two address generators 301, 303, the third address generator 305 is selected every other clock cycle with the higher priority address generator (either the first address generator 301 or the second address generator 303) occupying the other clock cycle.

Referring back now to FIG. 3, other aspects of the OBAG architecture will be described in further detail, beginning with the OB bus interface. In a preferred embodiment, the OBAG 205 uses the 16 most significant bits of the OB bus 111 to control and transfer images from the IPM 107 to the IM 103. The OB bus 111 preferably receives data only from the output buffer 203, so that the third address generator 305 supports this transfer. When the OB_CMD* signal is active the data on the OB bus 111 is utilized to set up the third address generator 305. Note that even though the OB bus 111 is nominally an output bus, when the OB_CMD* signal is active, the data placed on the OB bus 111 by the IM 103 is used as an input into the OBAG 205. If the OB_CMD* signal goes active while OB_OUTOE* is active, this should be treated as an abort signal and the OB_OUTOE* signal should go inactive and the data being transmitted should be discarded.

The only possible method for selecting the OB bus 111 is by identifying a particular IPM 107 that is to be responsive to the command. This is done by comparing the address residing in the IPM identification register, described above, with the address incorporated in the OB bus select command. If the two addresses are identical, then that IPM 107 will be selected. If the addresses are not equal, then that IPM 107 is not enabled.

The OB_VLD* signal is used to determine whether the data on the OB bus 111 is valid. When the OB_VLD, signal becomes active the data on the bus is valid. The OB_OUTOE* should become valid one clock cycle before OB_VLD* goes active in order to drive the data out onto the backplane and thus provide valid data when OB_VLD* becomes true.

The IB bus interface will now be described in greater detail. The size of each image that is transferred to the IPM 107 via the IB bus 109 corresponds to the size of the SIMD array 201. In the exemplary embodiment, this is a 64×96 pixel image for a system having a single IPM 107. When the real-time image processor 101 consists of multiple IPMs 107, a corresponding number of SIMD array-sized images must be transferred, one at a time. Consequently, each image transfer must identify a destination IPM 107. Selecting an IPM 107 for IB bus image reception preferably utilizes the IB bus data and control signals. First, the OBAG 205 determines whether the IPM address matches the identifier stored in the identification register. If it does, then the IPM 107 is enabled to receive image data from the IB bus 109. If enabled, the IPM 107 will accept and write data to the IBIB FIFO 211 when an IB_VLD* signal on the IB BUS 109 is active.

Figure 5:
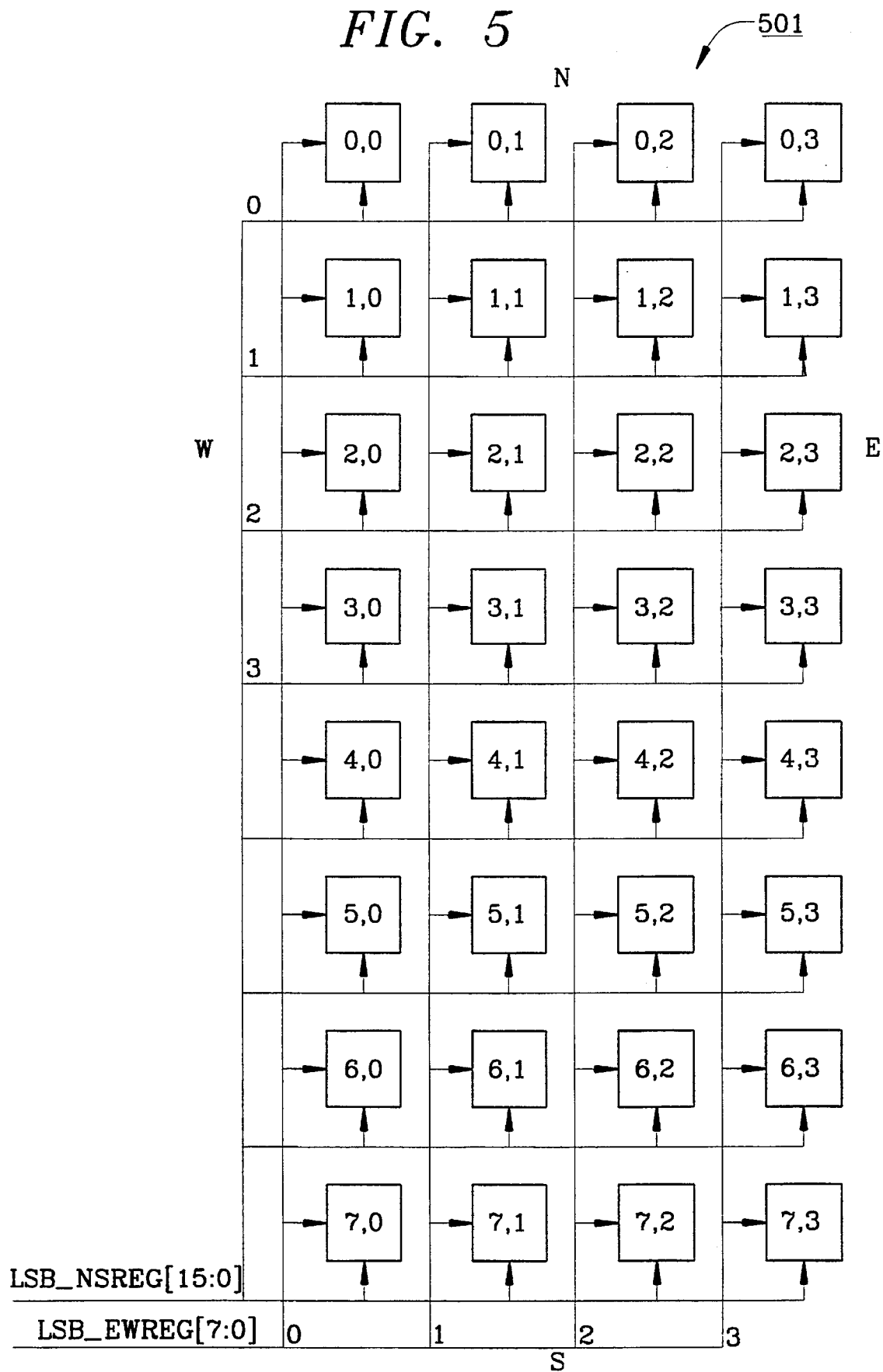
FIG. 5 is a block diagram illustrating the distribution of the overlay logic output signals to a SIMD processing array in accordance with the invention.

Another aspect of the present invention is the inclusion of overlay logic 309 in the OBAG 205. As previously mentioned, the SIMD array 201 preferably comprises GAPP IV chips. These chips have the capability of using bits in the SIMD instruction 227 to directly introduce data into the EW and NS buses. (A full description of this capability is presented in U.S. patent application Ser. No. 08/112,540, which has been incorporated herein by reference.) The overlay logic 309 on the OBAG 205 supports this feature as follows. The overlay logic 309 includes an array of X/Y pattern registers 501. The overlay logic 309 allows an overly of a pattern, previously loaded into the X/Y pattern registers by the GI bus protocol, onto the LSB of the NS or EW field of the SIMD instruction 227. In a preferred embodiment, each SIMD array 201 comprises a 4×8 array of GAPP IV chips, each of which comprises a 16×12 array of PEs, so that the SIMD array 201 is a 64×96 array of PEs. For injecting chip row patterns, a 16 bit Y register is used, 8 bits of which are used in correspondence with the 8 GAPP IV chips in the SIMD array 201. Similarly, for injection of chip column patterns, an 8 bit X register is used, 4 bits of which are used in correspondence with the 4 GAPP IV chips in the SIMD array 201. The overlay logic 309 is controlled by the OL_NS* and OL_EW* control signals. As described in patent application Ser. No. 08/112,540, an immediate data value may be injected into the EW bus via bit 5 ("LSB_EWREG") of the command sent on the GI bus 113, and an immediate data value may be injected into the NS bus via bit 2 ("LSB_NSREG") of that command. In accordance with the present invention, the boolean equations describing the modifications of the GAPP IV instruction command bits for an array of GAPP IV chips up to an 8 by 16 array are as follows: For i=0 to 7:

$$\text{LSB\_EWREG}[i] = (\sim(\text{OL\_EW*}) \,\&\, \text{LSB\_EWREG}_{in}) | (\text{OL\_EW*} \,\&\, (X[i] \wedge \text{LSB\_EWREG}_{in}))$$

and for j=0 to 15:

$$\text{LSB\_NSREG}[j] = (\sim(\text{OL\_NS*}) \,\&\, \text{LSB\_NSREG}_{in}) | (\text{OL\_NS*} \,\&\, (Y[j] \wedge \text{LSB\_NSREG}_{in})),$$

where $\text{LSB\_EWREG}_{in}$ and $\text{LSB\_NSREG}_{in}$ represent unmodified bits received from the IG 105, and $X[i]$ and $Y[j]$ represent the $i^{th}$ and $j^{th}$ bit outputs from the X and Y overlay registers, respectively. FIG. 5 illustrates the distribution of these bits to a 4×8 array of GAPP IV chips, in accordance with this invention.

As an example, in order to perform an overlay of a pattern onto the NS direction, the OL_NS* bit will become active, which indicates that a NS overlay is to occur. This will cause the pattern, held in the Y pattern register to be overlaid onto the output NS instruction LSB for each chip on the module. That is, bit 0 of the Y pattern register will be overlaid onto the input command bit and NS[0] will be the result. Bit 1 of the Y register will be overlaid onto the input command bit and NS[i] will be the result. This will be true for all 16 bits of the Y register. The X pattern register is similarly used when OL_EW* is active.

As previously mentioned, the OBAG 205 further includes FIFO control logic 311. This logic provides the control signals for the three sets of FIFOs: the IBIB FIFO 211, the OBIB FIFO 213, and the OBOB FIFO 217. The GI bus protocol determines which set of input FIFOs are selected.

Control of the IBIB FIFO 211 depends upon the IB_RD* signal as well as a register initialized by GI bus protocol. When the IB_RD* signal is active and the IB FIFO register indicates that the IBIB FIFO 211 is to be active, the IBIBI_RD* signal goes active, as does the IBIB_OE* signal. When data is to be written into the IBIB FIFO 211 from the IB bus 109, the OBAG 205 performs two functions: it provides address decode and IPM selection as previously described, and also controls the writing of 16-bit pixels into the 64 bit FIFO. Following selection, the OBAG 205 provides the IB_WR*(3:0) signals, where each signal controls the writes into 16 bit sections of the IBIB FIFO 211. As data is received upon the IB bus 109, the IB_WR* signals become active, thus writing pixel data into the IBIB FIFO 211.

Control of the OBIB FIFO 213 depends upon the IB_RD* signal as well as the contents of a register initialized by the GI bus protocol. When the IB_RD* signal is active and the IB FIFO register indicates that the OBIB FIFO 213 is to be active, the OBIB_RD* signal goes active, as does the OBIB_OE* signal. The OBAG 205 controls data written into the OBIB FIFO 213 in conjunction with the first address generator 301. The instructions from the GI bus initiate OB to SIMD array transfers. The OBAG's OBIB_FF_WR* signal controls the writes to the OBIB FIFO 213.

Control of the OBOB FIFO 217 depends upon the OB_FF_WR* signal. When this signal is active, data from the SIMD array 201 is written into the OBOB FIFO 217. When the OB_FF_RD* signal is active, data is read from the OBOB FIFO 217.

This description will now focus on the IG 105. In a preferred embodiment, the IG 105 includes (see FIG. 22) a first processor 2209 (which may be a Texas Instruments C40 processor), an Instruction Generator Coprocessor (IGC) 2211 (preferably in the form of an application specific integrated circuit (ASIC)), micro-store memory 2213, and a JTAG interface 2215. The main responsibility of the IG 105 is to generate and broadcast instructions to each IPM 107 in the real-time image processor 101. The first processor executes pure Ada or C++ object code and passes image coprocessing instructions to the IGC 2211, which generates, from each coprocessing instruction, an "expanded" stream of microinstructions for execution by the IPM 107. The fully expanded 40 MHz array instruction stream is distributed in parallel to all IPMs 107 via the GI bus 113. The IG 105 is also preferably responsible for test and maintenance of the real-time image processor 101, which is performed by an ASIC through the JTAG interface 2215. The IG 105 is a good candidate for placement of this function because the combination of SIMD array instructions with JTAG produces a more efficient way of testing a SIMD array 201.

The IG 105 is an integral part of the both the real-time processor hardware and software environments, since all SIMD array algorithms are directed by the IG 105. The IGC 2211 contains all the image processing microcode primitives recognized by the C++ and Ada compilers as image coprocessor directives, in much the same way as the sin() and cos() functions are recognized as math coprocessor directives by a personal computer's main processor. The IG 105 also performs the important function of managing SIMD array RAM 1603 (see FIG. 16) management by keeping track of image attributes (i.e., x-y skew, number of bits, etc.) and assigning specific SIMD array RAM bit planes to each symbolic image name that is used in the processing. This creates a high-level model for real-time image processor operation and simplifies programming for the algorithmist and execution control for the IG's first processor 2209.

As indicated in the BACKGROUND section above, the ability to process data at very high rates is not very useful unless the supporting hardware provides a way for that data to be quickly fed to and retrieved from the processing hardware. In the real-time image processor 101, this is the job of the IM 103, which will now be described with reference to FIG. 6.

The IM 103 transmits raw (or only partially processed) image data to, and retrieves processed data from the one or more IPMs 107 in the real-time image processor 101. The IM 103 also directly controls the processing of images via communication with the IG 105. As described above, the IG 105, in turn, provides SIMD array and other low-level control instructions to the IPMs 107 by means of the GI bus 113.

Overall control of the IM 103 is provided, in the exemplary embodiment, by two processors: an input control processor 607 and an output control processor 609. Each of these processors may be a Texas Instruments C40 digital signal processor (DSP), which should be allowed to operate at its maximum specified clock rate. The C40 processor is described in the TMS320C4x User's Guide, Rev A, May 1991, Texas Instruments Inc., which is incorporated herein by reference. The input control processor 607 controls and coordinates input imagery to be processed by the IPMs 107. The output control processor 609 controls the movement and analysis of image data received as output from IPMs 107. The processors also provide module to module communication, and maintain all programmable or dynamic variables required for full signal processor operation. The functions of the two processors 607, 609 include, but are not limited to, the following:

1) Directing communication with the IG 105;
2) Maintaining sensor frame starting locations within the frame buffer 611;
3) Computing the frame buffer addresses of windows to be extracted;
4) Controlling the operation of the input window extractor (IWX) 605 and the output window extractor (OWX) 613 (these features are described in greater detail below);
5) Performing all initialization and self test of the real-time image processor 101; and
6) Analyzing output buffer data and computing the output buffer address of any subsequent output buffer data extraction.

To support the operations of the input and output control processors 607, 609, corresponding RAMs 615, 617 are provided, each connected to a local bus of the respective processors. Each of the RAMs preferably has a minimum of 512 Kbytes of storage, and provides static storage requiring zero wait states. Additional RAMs 649, 651, each providing at least 512 Kbytes of storage, may additionally be provided on the global buses of the respective input and output control processors 607, 609. The output control processors 609 is further coupled to a programmable read only memory (PROM) 621, either by means of the corresponding local bus, as shown, or by means of that processor's global bus. The PROM 621 contains a bootstrap program for the output control processor 609. For this purpose, the PROM 621 should have a minimum size of 256K by 8. The access time of the PROM 621 is not considered critical, and may require more than one wait state. The input control processor does not have a bootstrap PROM, but instead preferably boots from the output control processor 609 via the com ports 623. In an alternative embodiment, neither the input nor output control processors 607, 609 would have a bootstrap PROM. Instead, they would both boot up from the IG 105 via com ports 625, 627, where the first processor 2209 on the IG 105 includes a bootstrap PROM. Where the PROM 621 is provided, however, this is preferably only for low level board functions. Program, application, and algorithm software should still be provided via a communication port attached to an external device.

A discrete control logic block 619 is illustrated being connected to the local bus associated with the input control processor 607. Alternatively, each of the input and output control processors 607, 609 could have corresponding discrete control logic blocks coupled to their respective global buses. The discrete control logic is used for on-board maintenance, such as interrupt conditioning, sensor FIFO resets, reading-external status signals, and the like.

Each of the input and output control processors 607, 609 preferably supports 6 communication ports, each port comprising 8 data signals and 4 control signals (token request, token request acknowledge, data strobe, and data ready). The ports are designed for efficient processor-to-processor communication. Upon reset, each of the processors should initialize three of its ports as outputs, and the remaining three as inputs. Two ports 623 (one input and one output) from the input control processor 607 are coupled to corresponding ports 623 on the output control processor 609 in order to provide communications between these two devices. Each of the input and output control processors 607, 609 further preferably provides a pair of input and output ports 625, 627 for coupling to the IG 105. A single port from each control processor 607, 609 could be used for this purpose, but this adds bidirectional turn around time in the communications. The remaining communications ports 629 are available for coupling to other hardware as applications require.

The exemplary embodiment of the invention has been designed for military applications, where very high speed operation is critical. However, it is anticipated that in commercial applications, where processing speed requirements are less demanding and where product cost is more of a factor, the functions of the input control processor 607 and the output control processor 609 could be performed by a single control processor. Those having ordinary skill in the art will readily be able to apply the teachings of the presently illustrated embodiment of the IM 103 to one having only a single control processor, and such an embodiment will not be described here in further detail.

In a preferred embodiment of the invention, the IM 103 supports the reception of pixel data from up to four sensors. Of course, this number is only exemplary, and the architecture of the IM 103 may be scaled to support more or fewer sensors, depending upon requirements. Each sensor port is preferably identical and consists of 16 data signals, a frame sync signal (indicating that the corresponding pixel is the first pixel of a frame), a data valid signal (indicating that the data and frame sync status signals on the sensor data bus 601 are valid), and a pixel clock.

All control and data signals of a sensor port should be synchronous to its pixel clock. The IM 103 requires the sending device (sensor) to maintain set-up and hold times to allow the data and status signals to be sampled with the rising edge of the pixel clock. All sensor data is treated as 16 bit pixels. When the data valid signal is active, sensor port data is written into a corresponding one of the sensor FIFOs 603.

This sensor interface permits the IM 103 to accept simultaneous image data from each of the four sensors. The sensors do not have to be synchronized in any way, nor do they have to present pixel data in the same format. (Format refers to the image size and its scan orientation. For example, RS170 sensors provide row scanned data, while most infrared sensors provide column scanned data.) The only requirement is that sensor pixels must be provided in an order such that successively received pixels should correspond to adjacent pixels in the image. This is typically a problem only with some infrared sensors that output columns with the pixel order scrambled within the column.

The pixel data from each sensor is buffered in a corresponding one of the sensor FIFOs 603. A sensor's pixel clock provides the write clock of its respective FIFO, while the FIFO's read clock is the same as the clock of the input window extractor (IWX) 605. In the exemplary embodiment, the IM 103 is designed to receive, from each of the four sensor ports combined, sensor data at a rate of up to 50 million pixels per second. (From a practical standpoint, however, the throughput will be lower because the reading of data from the frame buffer 611 usually requires the reading of some pixels twice, due to the occurrence of pixel overlay between adjacent subframes of data.) The sensor(s) may provide data in column scan, row scanned, or interlaced format, but the data must be digital data.

All sensor data is moved from the sensor FIFOs 603 to the frame buffer 611, which is preferably arranged as at least a 128K by 64 bit memory. To support a 100 Mpixel access rate (50 Mpixel writes and simultaneous 50 Mpixel reads), writing to and reading from the frame buffer 611 involves four pixels at a time.

When data is being simultaneously received from multiple sensors, the input control processor 607 allocates (via corresponding initialization of the IWX 605), for each sensor, a dedicated, but programmable, portion of the frame buffer 611. Thus, the entire frame buffer 611 could be assigned to a single sensor when only one sensor port is utilized, but smaller portions would be allocated when two or more sensors are supplying sensor data.

Within the frame buffer 611, sensor data is stored in sequential memory addresses of the allocated portion, four pixels per location. The allocated portion is used in a circular fashion, so that when the last location of the allocated portion is written, the next address to be written will be at the start of the allocated portion. This results in each sensor's pixels and sensor frames being concatenated with incrementing memory addresses within the allocated portion of the frame buffer 611.

To facilitate the reading of sensor data, the IWX 605 records and reports to the input control processor 607 the frame buffer address of the frame sync pixel (of each sensor), so that the address of any frame pixel may be computed. The IWX 605 also counts pixels and determines sensor line counts. A sensor line may be a complete row or column. Note that this requires the sensor to provide uniform line or column lengths. The IWX 605 maintains a sensor frame's stored line count for each sensor, thereby allowing it to determine sensor data availability and/or time within the frame, as directed by the input control processor 607. The IWX 605 is also capable of detecting when a specified quantity of sensor lines has been received from a sensor, and in response generating an interrupt to the input control processor 607.

The functions of frame buffer management, reception of images and extraction of windows (described below) are preferably handled by an input window extractor (IWX) 605, which may be constructed as an ASIC. Via initialization and control by the input control processor 607, the IWX 605 coordinates the reception and storage of sensor data into the frame buffer, as well as the extraction and transmission of pixel windows to the IPMs 107. The IWX 605 also computes and maintains pixel line counts for status and/or interrupts to the input control processor 607. The IWX 605 is described in greater detail below.

Image data to be processed by the IPM 107 is extracted from the frame buffer 611 as a rectangular array (i.e., a "window") of pixels whose array size equals the size of the SIMD array 201 on one IPM 107. In a system having more than one IPM 107, corresponding windows would have to be extracted separately for each. The image data that is extracted from the frame buffer 611 by the IWX 605 is then staged in an IB dual port memory 631 for subsequent transmission to an IPM 107. The IB dual port memory 631 is preferably an 8K×32 memory, configured as two FIFOs, so that the 64-bit word being read from the frame buffer 611 can be written in two successive 32-bit chunks, the first being sent out on the IB bus 109 while the second is being written into the IB dual port memory 631, in order to maintain a 50 Mpixel throughput rate. Thus, images are transferred to an IPM 107 via the IB bus 109. Alternatively, if the IB bus is only 16 bits wide (due to I/O pin limitations), the contents of the IB dual port memory 631 would be written to a 32-bit wide FIFO (not shown) which would transfer 16-bits at a time in successive writes to one of a pair of 16-bit wide IB buses (not shown).

If the real-time image processor 101 includes more than one IPM 107, the IM 103 may be required to supply multiple windows before the system can process a total SIMD array-sized image. Once an image has been transferred to the IPMs 107, the input control processor 607 informs the IG 105 (via the pair of input and output ports 625) of this fact and also specifies what type of processing is to be performed. The IG 105 then generates the necessary control signals to cause the IPM(s) 107 to carry out the desired processing.

The IB bus 109 is preferably a unidirectional, fully synchronous bus. The bus may preferably comprise 34 signals: 32 data signals, a bus command signal, and a data valid signal. An active data valid signal indicates valid image data upon the bus. An active bus command signal indicates that an IPM command is on the bus. Command data is interpreted by the IPMs 107 as described above, and is used to select individual IPMs for data reception.

After processing in the IPM(s) 107 is completed, the IG 105 instructs the IPMs 107 to place the processed results into the output buffer 203. The IG 105 then alerts the IM 103 of resultant data availability, and the IM 103 retrieves data from the output buffer 203 via the OB bus 111. Like the input images, output images are accessed in the form of IPM SIMD array-sized images ("windows"). Thus, where multiple IPMs 107 are involved, multiple window transfers may be required to access a processed image in its entirety.

The OB bus 111 is preferably a bi-directional, fully synchronous bus. The IM 103 retrieves processed data from the output buffer 203 of each IPM 103 via the OB bus 111. The IM 103 transmits command and control information to the IPMs 103 via the OB bus 111. In response to the control information, an IPM 107 returns processed data to the IM 103. The OB bus 111 preferably comprises 34 signals: 32 data signals, one bus command signal (to indicate that command data is on the bus) and one data valid signal (to indicate that valid data is on the bus). Three additional signals may also be provided for bus ownership protocol, to be used in an environment in which there are additional IM-type boards that would share the OB bus 111 (e.g., a board that would retrieve processed data and display it in real-time to a monitor). The latter three signals are: OB bus request in (OB_REQI*) (to indicate a higher priority device requests the bus), OB bus request out (OB_REQO*) (to indicate a local or higher priority bus request, and OB bus busy (OB_BSY*) (to indicate that a device owns the OB bus).

The IM 103 initiates the reception of image data from an IPM 107 by transmitting command data upon the OB bus 111. The IM 103 places command information on the OB bus 111 and asserts the OB bus command signal to indicate its presence. An IPM 107 will accept the command with the active OB bus command signal. Command information is used to select an individual IPM 107 and to request a specific block of data from its output buffer 203. The IM 103 preferably may request blocks from 8 bytes to 8 Kbytes in size, the larger number being limited by the size of the OB dual port memory 633. The selected IPM 107 returns the requested data with an active OB bus valid signal indicating the presence of valid data on the OB bus 111.

The OB bus 111 may be shared by more than one device. The IM 103 accesses the bus through the three priority bus request protocol signals. The OB_REQI* signal is an input that, when active, indicates a bus request from a higher priority device. The IM 103 asserts the OB_REQO* signal when the OB_REQI* signal is active, or when the IM 103 requests bus ownership. The requesting IM 103 assumes ownership of the OB bus 111 by asserting the OB_BSY* signal when both the OB_REQI* and OB_BSY* signals have been non-asserted for three bus clock cycles. So long as OB_BSY* is asserted, the IM 103 maintains bus ownership. Ownership of the bus is relinquished when OB_BSY* is deasserted.

The IM 103 has a dual port RAM, designated the OB DPRAM 633, for receiving requested image data from the output buffer 203 (via the OB bus 111). The OB DPRAm 633 should have a minimum of 32 Kbytes, preferably arranged as an 8K×32 memory. The OB DPRAM 633 may be used to temporarily store the image and/or examine the data. Accordingly, one port of the OB DPRAM 633 is connected for receiving data from the OB bus 111 (through the transceiver 635) with a corresponding address 637 being supplied by the OWX 613. The address and data lines 639 of the other port are coupled to permit accessing by the output control processor 609.

In accordance with another aspect of the invention, the IM 103 provides hardware support for quickly identifying areas of interest in a processed image. Specifically, algorithms that are performed in the SIMD array 201 may tag areas of interest within an image by setting (i.e., forcing to a "1" value) a bit in an array-sized image comprising 1 bit values (a "bit-plane"). The IM 103 provides hardware support for enabling the output control processor 609 to rapidly test a bit-plane in search of set bits (referred to here as "hits"). When this feature is enabled by the output control processor 609, special "hits" hardware (located within the OWX 613) monitors, via hit data line 641, bit-plane data being received from the OB bus 111. The hits hardware tests the values of the incoming data, and records the OB DPRAM address of any non-zero values. Non-zero values indicate a tagged position or hit. The recorded addresses may be read from the OWX 613 by the output control processor 609, by means of the output control global bus 643, and used by the output control processor 609 to limit memory examination to only those locations of the OB DPRAM 633 that have known hits. The IM 103 also provides hardware support ("bit extraction logic"—described below) that quickly tests and locates set bits within a 32 bit word.

The OWX 613 controls the above-described transfer of images to and from the IM 103 via the IB bus 109 and the OB bus 111, and also assists the output control processor 609 with bit-plane target list analysis. All operations of the OWX 613 are controlled by the input and Output control processors 607, 609. The OWX provides two processor interfaces, one for control of the IB bus 109, and one for control and data analysis of the OB bus 111.

As described above, the IB bus 109 is connected to the IB dual port memory 631. The OWX 613 provides the IB dual port memory 631 with the required read addresses to transmit image data to the IPMs 107. The OWX 613 additionally provides bus request functions for the OB bus 111 and provides the memory addresses required to write data into the OB DPRAM 633 from the OB bus 111. And, as mentioned above, the OWX 613 also supports the locating of hits within a requested output buffer bit-plane. The OWX 613 is described in greater detail below.

As mentioned above, the IWX 605 is a critical part of the IM 103 that is responsible for bringing in raw image data from the sensor inputs 601, storing it in the frame buffer 611, reordering the pixels to provide a uniform format and outputting portions of the data, called windows, to the IB dual port memory 631. The format of the data stored in the IB dual port memory 631 is independent of the type of sensor from which it was received, so that the OWX 613 can use a uniform technique for sequencing the data out to the IPM 107, without having to take into consideration particular sensor formats.

Figure 6:
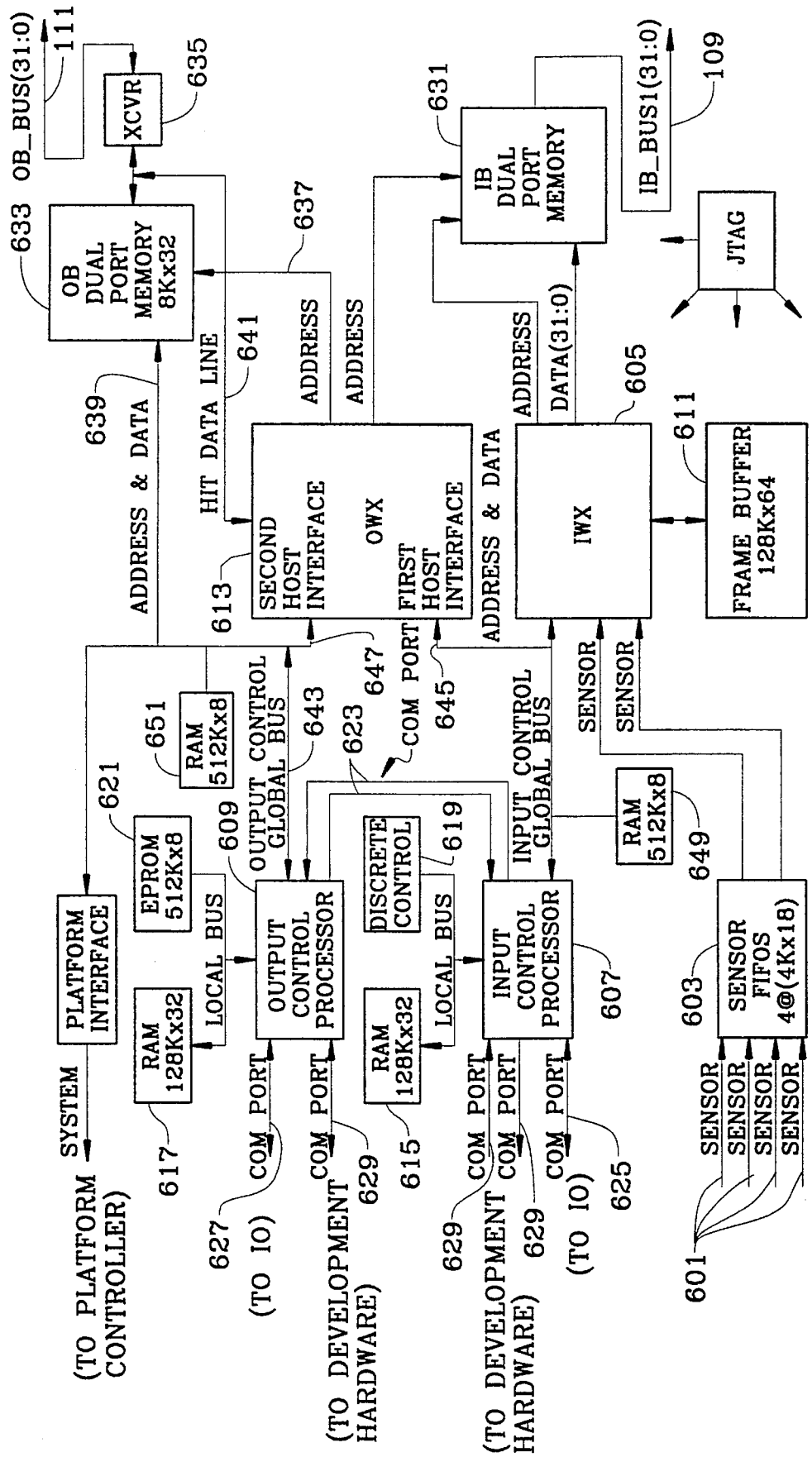
FIG. 6 is a block diagram of an image manager in accordance with the present invention.
Figure 7:
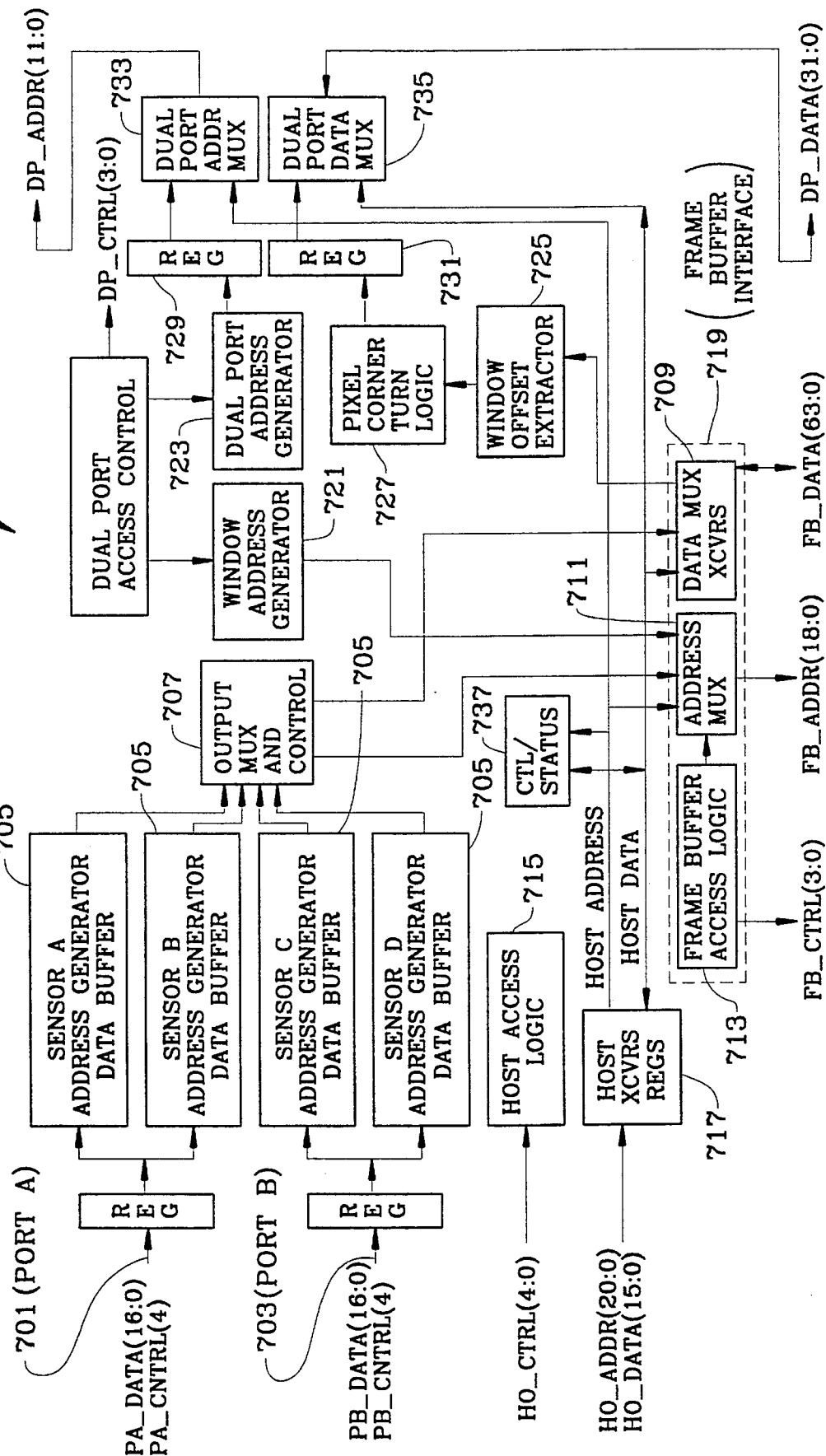
FIG. 7 is a block diagram of an illustrative embodiment of an input window extractor in accordance with the invention.

An illustrative embodiment of the IWX 605 will now be described with reference to FIG. 7. The IWX 605 supports up to four sensors over two interface ports (two sensors per port): port A 701 and port B 703, each of which is capable of strobing data in at a rate that is preferably at least 50 Mhz. Each of the ports is intended to be connected directly to a standard FIFO device, and comprises 17 data (PA_DATA(16:0) AND PB_DATA(16:0) and 6 control (PA_CNTRL(6) AND PB_CNTRL(6)) lines. As shown in FIG. 6, the two ports are coupled to receive outputs from the sensor FIFOs 603, which consist of four FIFOs: FIFO A, FIFO B, FIFO C and FIFO D. For each of ports A and B 701, 703, the data lines consist of 16 bits of sensor bus data and 1 bit for the frame sync signal. Port A 701 is designed to receive data either from FIFO A or FIFO B, and has the following control lines: FIFO A empty (PA_EMPTYA*), FIFO B empty (PA_EMPTYB*) and FIFO A read enable (PA_RDENA*), FIFO B read enable (PB_RDENB*). Similarly, Port B 703 is designed to receive data either from FIFO C or FIFO D, and has the following control lines: FIFO C empty (PB_EMPTYC*), FIFO D empty (PB_EMPTYD*), FIFO C read enable (PB_RDENC*) and FIFO D read enable (PB_RDEND*). Data from the sensor interface is strobed in on the 50 Mhz clock when the respective PA/B_OEA/B/C/D* signal is active.

The data received from the ports 701, 703 is moved by the IWX 605 into the frame buffer 611. For this purpose, frame buffer addresses are generated for each sensor by a corresponding one of the sensor address generators 705. The sensor address generators 705 also combine the sensor input data with a sensor ID that indicates whether the data is from sensor A or B (C or D). This ID is provided to the data demux sequencer (part of the output mux and control 707) so that it can determine which sensor buffer (in the frame buffer 611) that the data is to be stored in. The sensor address generators 705 further include hardware for buffering four 16 bit words, so that data can be written to the frame buffer 611 64 bits at a time.

Selection of one of the four sensors' data and generated address is performed by the output multiplexor and control circuit 707. The selected data and address outputs of the output multiplexor and control circuit 707 (i.e., the selected data) are provided as inputs to the frame buffer data multiplexor transceiver 709, and the frame buffer address multiplexor 711, respectively. Control for the data buffer address multiplexor 711 is provided by the frame buffer access logic 713.

Two styles of data formatting are supported by the IWX 605. These include data formatted in either column or row order. Column order is commonly used for flir sensors. In flir sensors a scanner wand (with a column of sensors) is driven back and forth across the field of view. Each angular position of the sensor corresponds to one particular row position and contains one complete column of data. The data is therefore sent in groups of column data for each row position. Considering an image as a two dimensional array with data stored sequentially in the frame buffer 611, the format of the data is in the form of (r,c) (r=1..nrows, c=1..ncols) whereby "c" increments for each pixel and "r" increments for every Terminal Count (TC) of "c".

For Column order format the memory position of a pixel can be determined by the following formula: Pixel(r,c) Location=(r*ncols)+c.

Row order is commonly used for raster scan video-type sensors. In raster scan a single sensor is driven back, and forth across the field of view and incremented down one row for each pass. Each angular position of the sensor corresponds to one particular row position and contains one single column data element (not a complete column of data). The data is therefore sent in groups of row data for each column position. Considering an image as a two dimensional array with data stored sequentially in frame buffer memory the format of the data is in the form of (r,c) (r=1..nrows, c=1..ncols) whereby "r" increments for each pixel and "c" increments for every Terminal Count (TC) of "r".

For Row order format the memory position of a pixel relative to a frame starting address, for purposes of window extraction, can be determined by the following formula:

Pixel (r,c) Location=(c*nrows)+r.

Data is latched into the IWX 605 whenever a FIFO empty flag is negated. Up to two sensors, and their input FIFO'S 603, are supported for each IWX input channel (port A 701 and port B 703). Since these channels potentially can handle only the burst rate of one sensor, priority must be assigned to determine which sensor data is stored first in the event that both FIFO's are indicating data ready. This priority is controlled by the host control register 737 with a bit defining either fixed A then B (C then D) or rotating A/B (C/D) priorities.

Sensor data is stored in the frame buffer 611 one frame window at a time. This frame window consists of either an entire frame (for small sensors 512×512 or smaller) or as a slice of a frame (either a group of columns or rows) of a size equal to the number of column sensors times the number of angular row samples for which sufficient frame buffer memory exists to store them. For example, consider a flir sensor with a wand having 512 elements with a scan of 4096 angular positions. This gives a frame size of 512×4096. Since the frame buffer 611 cannot hold all of this, the IWX 605 simply overwrites the oldest sensor data. This will require the real-time image processor 101 to process that data before it is overwritten.

The sensor address generators 705 will now be described in more detail. The frame buffer 611 may be divided into four sensor areas (or sections), each served by a corresponding one of the sensor address generators 705. Each of the sensor address generators 705 includes the following registers:

1) Storage Address Register/Counter—The Storage Address Reg/Ctr (SARC) is a 20 bit register that generates the address for the sensor data. This register serves as both a base and an offset address for a circular buffer, within the frame buffer 611.

2) Circular Buffer Offset Mask Register—The Circular Buffer Offset Mask Register (CBOMR) is a 20 bit register that sets the counter carry propagate mask for the SARC such that some number of low order bits will serve as a counter (when masked with 1's) and the rest of the SARC will remain at a fixed value (from MSB to lowest bit with 0 in the CBOMR). Thus, for example, if the SARC contains the hex value 0×03000 and the CBOMR contains the hex value 0×00FFF, then the SARC addresses will increment from 0×03000 through 0×03FFF and then start again at 0×03000.

3) Row/Col Pixel Counter—The Row/Col Pixel Counter (RCPC) is preloaded with the size (or length in pixels) of the row (or column) for the corresponding sensor, and is decremented for each pixel stored. When reaching 0 it generates a Row/Col sync pulse and reload signal.

4) Row/Col Scan Counter—The Row/Col Scan Counter (RCSC) counts the number of lines or columns received and serves to indicate how far into the frame the current sensor sweep has passed. This counter increments by one for each sync pulse generated by the RCPC.

5) Reference Scan Interrupt Value—The Reference Scan Interrupt Value (RSIV) is compared to the RCSC and generates an interrupt when the RCSC≧RSIV. This supports sensor synchronization with the host.

The input control processor 607 serves as a host for the IWX 605, and is responsible for setting up the SARC, CBOMR, RCSC, and the RSIV after a system Reset. The value of these registers may be read at anytime. The RSIV may also be written at anytime, even during sensor data reception.

Frame buffer address sequencing is accomplished by the combination of the SARC and the CBOMR. During initialization, the SARC is written with the base address of the location in the frame buffer 611 corresponding to the start address of the buffer. This address is based on the $2^n$ position such that the complete buffer fits within and fills a space of $2^n$ locations. Therefore the lower n bits of the base address should be (but do not have to be) zero when initialized. The CBOMR must be loaded with a pattern such that n Least Significant Bits (LSBs) are 1's and the upper 20-n Most Significant Bits (MSBs) are 0's. This will allow the n LSBs to increment as a counter while the MSBs remain fixed, thus forming a circular buffer of size $2^n$.

Each time a valid pixel arrives for a given sensor, the LSBs (enabled by the CBOMR) of the corresponding SARC register are incremented by one. This process continues until all the LSBs of the corresponding SARC register read 1's. Upon receiving the next pixel, the LSBs of the SARC register will increment to 0 without the MSB's changing value. This creates a circular buffer into which data can continuously flow. The only limitation of this technique is that the image processing operations must stay ahead of the input to avoid loss of data due to its being overwritten.

The IWX 605 provides two interrupts to aid the host in sensor data synchronization. These interrupts are derived from the frame sync and the IWX line count. Upon assertion of frame sync, the RCSC is cleared and the RCPC is reinitialized. Any data within the sensor buffer will be discarded since the downcount of the RCPC counter should have properly stored the last Row/Column of data. The IWX 605 will also record and place in a Frame Address Register (FAR) (part of the host control and status registers 737) the starting frame buffer address of the next frame of sensor data. The occurrence of a frame sync may be an IWX interrupt source.

The IWX 605 may generate another interrupt when the value of the RCSC is greater than or equal to the value of the RSIV. This interrupt may be utilized by the host to synchronize flow of data into and out of the frame buffer. With this interrupt the host will know where the frame buffer input data is with respect to the frame buffer output data and it can manage the output data flow to avoid retrieving bad data. Bad data could occur if the host waits too long to retrieve sensor data or accesses the data at too fast a rate. If the host accesses the data too fast it may catch up and pass the input operations, thus reading data beyond the current storage position of the frame buffer. If the host accesses the data too slowly, the input buffer pointer (and data storage) may circulate through the buffer, thereby overwriting the desired data.

Data input at the beginning of a Row or Column Scan is stored so as to be aligned on 64 bit boundaries. This is accomplished by detecting either a frame sync or an end of row or column sync. Upon detection of such a signal, the sensor data buffer in the corresponding sensor address generator 705 flushes out its value to the output, and starts reading in a new 64 bit word. The next pixel to be stored will therefore be the first to be stored in the next 64 bit word, which will be aligned to the next frame buffer address.

A special case is encountered when the data is row ordered and the input sensor scans in an interleaved (i.e., RS170) fashion. In this case, the data is written in two fields with one following the other in its entirety. No special address generation is performed. This means that the data in the frame buffer 611 will be stored according to fields for interleaved sensors and according to frames for non-interleaved sensors. The input control processor 607 (i.e., the host) recognizes this and handles the data extraction and formatting for output to the IPM 107 accordingly. Data may be processed as field or frame data.

When more than one of the four sensor address generators 705 has a word ready for output, arbitration is required in order to determine which sensor's data shall be written to the frame buffer 611 first. The input control processor 607 is able to select from one of two schemes for handling this arbitration. The first scheme is a fixed priority A/B/C/D with sensor data stored first from A then B, etc. The second scheme is a rotating priority whereby each time an access occurs the priority moves to the next sensor, rotating through A-B-C-D each having highest priority at some point in time.

The input control processor 607 controls all sensor data gathering operations by means of the host access logic 715 and the host transceiver registers 717. It initializes the four sensor address generators 705 and provides enabling signals to begin frame data acquisition.

Frame data acquisition begins on the next frame sync found from the time the host enables data acquisition. All other data clocked into the IWX 605 from the sensor FIFOs 603 prior to the frame sync being found are discarded since the pixels' location in the frame will not be known.

The sensor data acquisition process continues for as long as the Sensor Scan Enable bit for that sensor's control register (located in the host's control and status registers 737) remains set. When the Sensor Scan Enable bit is clear, the data acquisition continues for the rest of the current frame. If an immediate halt of data acquisition is needed then the Sensor Scan Abort bit should be set. This will stop the data acquisition for that channel and clear the Sensor Scan Enable bit.

A host interrupt is provided such that when any of the four Sensor's Data Row/Column Scan Counters (RCSC) is greater than or equal to the host-initialized Reference Scan Interrupt Value (RSIV). This signals the host that a desired point has been reached in the Sensor Frame being written to the Frame Buffer. This is used by the host to coordinate the activity of the Sensor Input operations with other real-time image processor 101 operations.

When a sensor is not enabled, the IWX logic will not attempt to read data from that sensor's corresponding one of the sensor FIFOs 603. This prevents the disabled sensor from feeding data into the sensor buffer where it would stall the input pipeline and therefore sensor input operations.

The input control processor 607 controls the sensor interface through the following registers:

1) Sensor Storage Address Register/Counter (SARC)—(read/write) Contains the pixel data storage address for a particular sensor. The counter function forms a rotating buffer of size (n) controlled by the CBOMR.

2) Circular Buffer Offset Mask Register (CBOMR)—(read/write) Controls the size (n) of the SARC by providing a counter carry propagation mask for the SARC. The first bit up from the LSB that is a zero will break the counter chain.

3) Row/Column Pixel Counter (RCPC)—(read/write) Counts pixel and generates a terminal count (TC) when the end of a scan line is reached.

4) Row/Column Scan Counter (RCSC)—(read/write) Counts scan lines.

5) Row/Column Scan Size Register (RCSSR)—(read/write) Contains a value representing the number of pixels (Row or Column) contained in a scan line.

6) Row/Column Frame Size Register (RCFSR)—(read/write) Contains a value representing the number of scan lines (Row or Column) that make up a frame.

7) Reference Scan Interrupt Value (RSIV)—(read/write) Reference value to be compared with the RCSC to generate an interrupt when a match is found.

8) Sensor Command Register (SCR)—Command/Status register for each sensor.

9) Frame Buffer Frame Starting Address (FBFSA)—(read) Holds the address in the frame buffer 611 that corresponds to where the first data was stored that followed the last encountered Frame Sync.

Each sensor supported by the IWX 605 has a corresponding set of the above-described registers.

The SCR provides the following control/status bits to allow for control of each of the four sensor channels:

1) Sensor Format—(2 bits, read/write) This field signifies the type of data stream that is supplied by the sensor (i.e., Column, Row, or Interleaved Row).

2) Sensor Scan Enable—(1 bit, read/write) Enables scan operations for the sensor.

3) Sensor Scan Abort—(1 bit, read/write) Abort ongoing scan data collection operations.

4) Arbitration Mode—(1 bit, read/write) Selects fixed or rotating priority for accesses from multiple sensor buffers to the Frame Buffer 611.

5) Frame Found—(1 bit, read) Indicates that a frame sync was found and that data is currently being collected and stored in the Frame Buffer 611.

6) Frame Overrun—(1 bit, read) Indicates that more pixel data arrived than was expected for that frame. Will be waiting for next frame sync before data acquisition continues by storing data into the frame buffer 611.

7) RSIV Interrupt—(1 bit read) Indicates that an interrupt is pending for one or more of the sensor buffers.

The frame buffer interface 719 is responsible for managing the data flow into and out of the frame buffer 611. It provides arbitration and control to allow access from one of three sources: the sensor interface (i.e., the sensor address generators 705 and supporting hardware including the output mux and control circuit 707), the host interface (i.e., the host access logic 715 and host transceiver registers 717) and the dual port interface of the frame buffer 611.

The frame buffer access logic 713 is responsible for controlling access to the frame buffer 611. During normal operation, sensor data is moved into the frame buffer 611 and then output to the IB dual port memory 631. To maintain an interleaving of accesses between the sensor interface and the IB Dual Port memory interface, the priorities of these two interfaces are toggled with each access to the frame buffer 611. Access to the frame buffer 611 is preferably maintained at a 25 Mhz rate, which gives the IWX 605 a 200 Mbyte access rate, which is equivalent to a 100 Mpixel (16 bit) access rate (50 Mpixel input and 50 Mpixel output). Therefore, arbitration for a next access must be performed concurrently with a present access so that the next granted access can proceed immediately following the completion of the current one. To accomplish this, the sequencer should be operated off of a 50 Mhz clock.

A diagnostic mode is preferably provided whereby the Host Interface instead of the Sensor Interface, is given access to the Frame Buffer 611. In this case, the Host Interface and the IB dual port memory interface have interleaved access to the frame buffer 611. (The arbitration priorities for these interfaces are exchanged after each access.) The host in this case has read/write access to the frame buffer 611 and can inject images into the frame buffer 607 for testing the IB Dual Port memory 631.

This diagnostic mode is enabled/disabled through a control bit in a frame buffer control/status register located in the host access logic 715. This register controls a number of frame buffer access parameters, and is formatted as follows:

1) Enable Normal Operations—(1 bit read/write) Allows the sensor interface and the IB dual port memory interface to perform transfers to/from the frame buffer 611.

2) Enable Test Mode—(1 bit read/write) Overrides normal operations to allow the input data to come from the host instead of from the sensor interface. The Enable Normal Operations bits (for the four sensor channels of the Sensor Interface) are cleared when this bit is set.

3) Arbitration Priority—(1 bit read) Indicates which of the sensor interface (or host interface) and the IB dual port memory interface currently have higher priority for accessing the frame buffer.

4) Priority Modes—(1 bit read/write) Indicates whether rotating or fixed priority is in effect for accesses to the frame buffer 611.

5) Priority Select—(1 bit read/write) Indicates which of the sensor interface (or host interface) and the IB dual port memory interface shall be given higher priority for accessing the frame buffer 611.

Thus far, the discussion of the IWX 605 has focussed on the movement of data from the sensor ports 701, 703 into the frame buffer 611. The following discussion will describe the features in the IWX 605 that support the movement of that data from the frame buffer 611 to the IB bus 109, thereby making it available to the one or more IPMs 107.

The IWX 605 includes a number of components that, together, are responsible for window extraction, reformatting, and outputting to the IB dual port memory 631. These components, which will be referred to collectively as the IB dual port memory interface ("IBDPMI") include: a window address generator 721, a dual port address generator 723, a window offset extractor 725, pixel corner turn logic 727, and an output section comprising registers 729, 731, a dual port address multiplexor 733 and a dual port data multiplexor 735. The input control processor 607 provides the necessary parameters and starts the extraction process for each desired window. The input control processor 607 also considers any required overlap between windows when it specifies the starting position of the window to be outputted. (Such window overlap is a function of the particular processing algorithms that are being performed on the data as a whole.)

Preferably, all extracted windows are the size of the SIMD array 201 in each of the IPMs 107, although sub-SIMD array-sized windows could be extracted for a special algorithm. An example of a SIMD array size is 64×96 (64 columns and 96 rows).

Output data from the IWX 605 is formatted according the size of the associated SIMD array 201. The width (east-west extent of the PEs) of the SIMD array should optimally be a function of 32. The IWX 605 outputs data formatted into pairs of 16 bit pixels that form 32 bit wide loadable words. The window height (north-south extent of the PEs) can be of any size that can be accommodated by the frame buffer 611 and/or the IPM 107.

Each window extraction operation requires that the host initialize the IBDPMI registers and give it a start signal. At that point the IBDPMI will carry out the extraction of the requested window from the frame buffer 611, will signal the input control processor 607 with an interrupt, and will pulse active the IB_RDY* signal to the OWX 613 for 500 ns or 25 clock cycles. The DP_EXC* signal is used to notify the OWX that an output window is available.

As previously described, during normal operation of the real-time image processor 101, image data is retrieved from up to four sensors and stored in the frame buffer 611. This data is not reformatted in any way by the sensor interface and is stored in the sensor format in which it arrived, which can be either Column, Row, or Interleaved Row Ordered.

To accommodate the variable number of sensors which can be connected to the real-time image processor 101, the frame buffer 611 may be logically divided into up to a corresponding number of sections (four in the exemplary embodiment) with each logical section corresponding to a particular sensor (A, B, C or D). These are all circular buffers with addressing controlled by the input control processor 607 via the host interface on the IWX 605. The variable size and starting addresses of the buffers are loaded into the appropriate sensor interface registers.

Within each of the four sections of the frame buffer 611, sensor data is stored in a continuous fashion utilizing a rotating buffer concept. This means that the memory will is organized in a fashion whereby an address pointer is incremented through a memory range, such that after the address pointer reaches the end of its range, it simply increments back to the first location of the range. Therefore once the data size becomes greater than the buffer size, the additional data entering the buffer overwrites the oldest data present in the buffer. Care must be exercised by the input control processor 607 to coordinate the sensor interface and the window address generator 721 so that they do not interfere with each other. One suggested technique is to ensure that the size of the circular buffer is always greater than the number of rows or columns required to hold one window (a buffer equal to two times the size of one window would be desirable). Two window (row/col) sizes would allow the host to keep the sensor interface operating in one half of the buffer while the window address generator 721 is operating in the other.

Figures 8A, 8B:
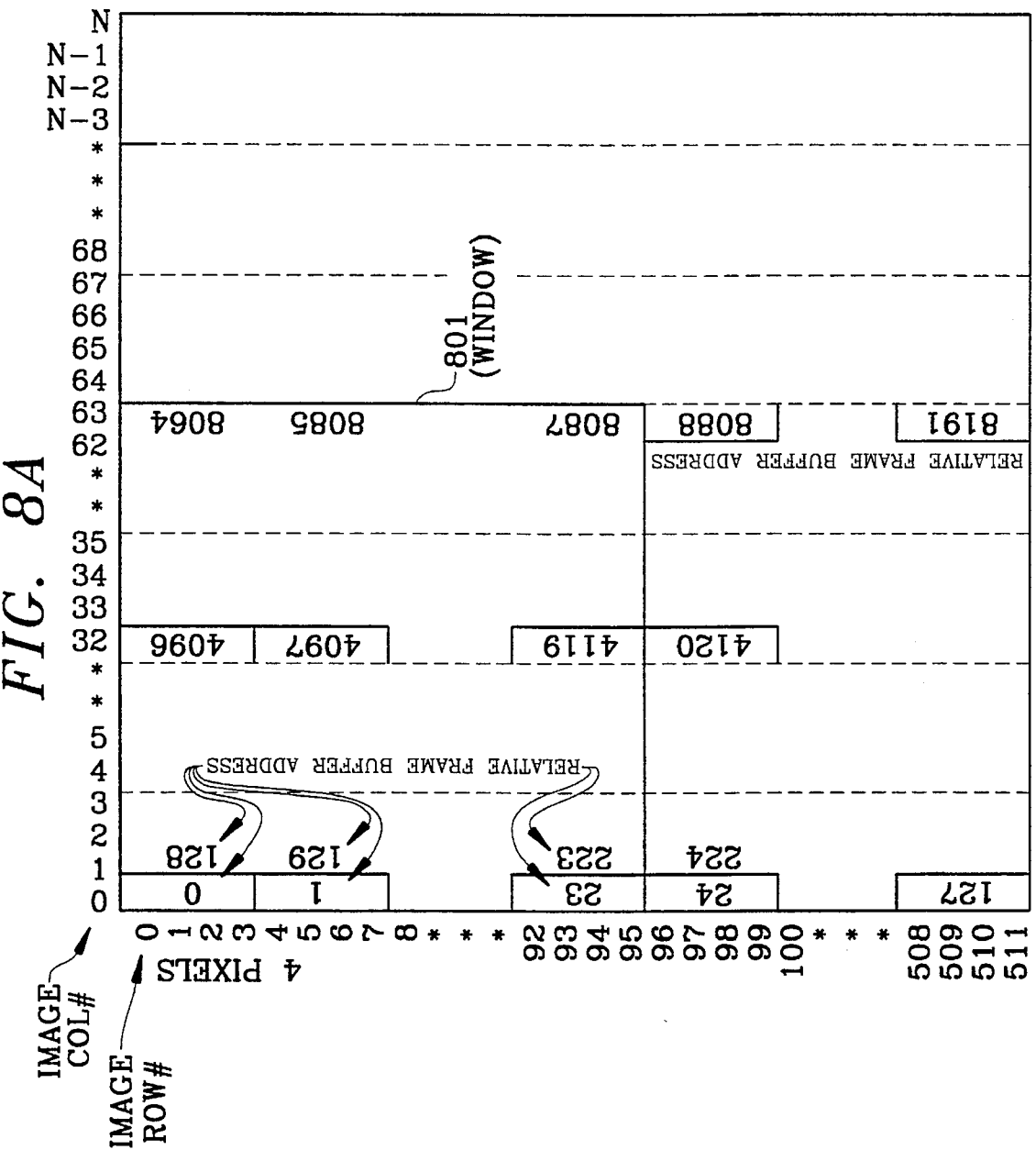
FIGS. 8(a)–(b) illustrate, respectively, the frame buffer data storage format for column oriented sensor data, and the order in which those pixels would be extracted from the frame buffer to read the window in accordance with the present invention.

Use of the frame buffer 611 will now be illustrated for several different data formats. FIG. 8(*a*) shows the data storage format for a Column oriented sensor. In this example, a 512×N frame size is assumed. Such data could have been supplied by a Flir Sensor having a sensor wand containing 512 elements that sweeps over N columns. In the figure, sensor data begins storage at frame buffer address 0

(i.e., the address base offset is 0). At frame buffer address 0, the values of four 16-bit pixels are stored (Pixels 0, 1, 2 and 3). At frame buffer address 127, pixels 508, 509, 510 and 511 may be found. The window 801 shows the frame buffer addresses that must be read in order to extract a 96×64 pixel window at pixel location 0,0 in the upper left hand corner. Of course, this illustration assumes perfect alignment of 4-pixel boundaries.

FIG. 8(*b*) depicts the order in which pixels will be extracted from the frame buffer 611 to read the window 801. The address generation for window extraction is described in greater detail below.

FIG. 9(*a*) shows the data storage format for a Row oriented sensor. In this example, a 512×512 frame size is assumed. Such data could represent a non-interlaced video image that is 512×512 in size. In the figure, sensor data begins storage at frame buffer address 0 (i.e., the address base offset is 0). At frame buffer address 0, the values of four 16-bit pixels are stored (Pixels 0, 1, 2 and 3). At frame buffer address 127, pixels 508, 509, 510 and 511 may be found. The window 901 shows the frame buffer addresses that must be read in order to extract a 96×64 pixel window at pixel location 0,0 in the upper left hand corner. Again, this illustration assumes perfect alignment of 4-pixel boundaries.

FIG. 9(*b*) depicts the order in which pixels will be extracted from the frame buffer 611 to read the window 901. The address generation for window extraction is described in greater detail below.

FIG. 10(*a*) shows the data storage format for an Interleaved Row oriented sensor. This example assumes a 512×512 frame size. Such data could represent an interlaced video image that is 512×512 in size. At frame buffer address 0, the values of four 16-bit pixels are stored (Pixels 0, 1, 2 and 3). At frame buffer address 127, pixels 508, 509, 510 and 511 may be found. The window 1001 shows the frame buffer addresses that must be read in order to extract a 96×64 pixel window at pixel location 0,0 in the upper left hand corner. Again, this illustration assumes perfect alignment of 4-pixel boundaries.

FIG. 10(*b*) depicts the order in which pixels will be extracted from the frame buffer 611 to read the window 1001. The address generation for window extraction is described in greater detail below.

FIG. 11 illustrates the storage, in the frame buffer 611, of images supplied by four sensors. Here, the frame buffer 611 is logically divided into four 128K sensor buffers 1101, 1103, 1105, 1107. In practice, however, these buffers could be different sizes and occupy different positions in this frame buffer 611. These sensor buffers are defined by the SARC and CBOMR for each of the four sensors (described above). The upper portion of the SARC defines the base address of the sensor buffer, while the lower portion that is enabled by the CBOMR bits is a pointer into the buffer for the next pixel to be written within the sensor buffer. Because of this, the starting address and buffer size must be a power of 2.

This example illustrates a number of features. First, it can be seen that the formats in which the data are stored for the various sensors need not be the same. It can also be seen that the sensor B buffer 1103 has just written new data at an address that is less than an address at which is stored old data. It can further be seen that, in the sensor C buffer 1105, Frame C is already written and can be output to an IPM 107. Frame C1, however, is just starting to be written, with the SARC_C pointer pointing to the first location in the second window.

Window extraction operations are managed entirely by the input control processor 607 (acting as host processor). For each window extracted, the host must set up the appropriate registers and set the Start Extraction bit in the window output control register. During extraction, the host can read the window output control register to get the status of the IB dual port memory interface. The Extraction Busy and Extraction Done bits are provided for this purpose.

If the host needs to abort a window extraction operation already in progress, all it has to do is set the Abort Extraction Bit in the window output control register.

Upon the completion of a window extraction operation, indicated by the setting of the Extraction Done bit, a completion interrupt is generated. This allows the IWX 605 to handshake with the host through the use of interrupts.

The following is a description of the registers in the window output controller:

1) Window Base Extraction Address (WBEA)—Base address (reference point) of the window stored in the frame buffer 611.

2) Window Offset Address Register (WOAR)—Contains the offset value for the first pixel location of the window of interest. This corresponds to the pixel located in the (0,0) position of the window.

3) Window Offset Mask Register (WOMR)—Contains the mask that enables rollover of the WOAR to support the previously described rotating buffer scheme for sensor data storage in the frame buffer 611. This mask is applied to the sum of the WOAR, WPAS, and RSLC.

4) FB Word Pixel Offset Value (FBWPOV)—A number in the range of 0 to 3 representing the offset of the first valid pixel from the most significant byte in the first frame buffer word in the window. This also denotes the last+1 valid pixel from the most significant byte in the last FB word of the window.

5) Array Column Size (ACS)—Column size for the SIMD array 201. The example used in this specification is a 64×96 (Col×Row) GAPP IV array.

6) Array Row Size (ARS)—Row size for the SIMD array 201. The example used in this document is a 64×96 (Col× Row) GAPP IV array.

7) Sensor Column Size (SCS)—Column size for the Sensor Data which is to be extracted from the frame buffer 611.

8) Sensor Row Size (SRS)—Row size for the Sensor Data which is to be extracted from the frame buffer 611.

9) Window Output Control Register (WOCR)—Main control register for the IB dual port memory interface. The control bits of this register are defined as follows:

Window type—(Read/Write) Defines the Sensor Data type for the window to be extracted. Possibilities include Column, Row, Interlaced Row.

Start Extraction (Write) When set initiates a window extraction process.

Extraction Busy (Read) Indicates that a window extraction is in progress.

Extraction Done (Read) Indicates the completion of the currently commanded window extraction. This indicates that the window is completely stored in the IB dual port memory 631.

Abort Extraction—(Write) When set, aborts any window extraction operation that may be in progress.

Host Access—(Write) Enables a host access operation whereby data is transferred between the Host transceiver registers 717 and the IB dual ported memory 631.

The window address generator 721 is responsible for generating address sequences that allow for the extraction of a window from a sensor image stored in the frame buffer 611. When combined with the effects of the dual port address generator 723, the extracted window will be placed in the IB dual port memory 631 in a single format that is sensor independent and formatted in such a way as to support a 32 bit IB bus 109.

There are three types of window address generator sequences that correspond to the extraction of Column, Row, or Interleave Row oriented images. The address sequence chosen from the three types is based on the type of sensor indicated by the input control processor 607 in the window output control register. The window address generator 721 includes the following registers which are used for extracting data from the frame buffer:

1) Window Frame Base Address (WFBA)—Base address (reference point) of the sensor frame data stored in the Frame Buffer.

2) Window Offset Address Register (WOAR)—Contains the offset value for the first pixel location of the window of interest. This corresponds to the pixel located in the (0,0) position of the window.

3) Window Offset Mask Register (WOMR)—Contains the mask for the WOAR that enables rollover of the WOAR to support the rotating buffer scheme. This mask is applied to the sum of the WOAR, WPAS, and RSLC.

4) Window Pixel Address Sequencer (WPAS)—Provides sequencer to carry out addressing for one Column or Row of Data. This sequence is dependent on the type of data Column or Row and the size of the array. A terminal count is generated on the last value output before the sequence repeats. This Sequencer increments after each frame buffer memory location is read.

The address sequences shown are for a 64×96 SIMD array 201 which requires a 64×96 (Col,Row) window to be extracted. For other sized arrays the following changes would occur:

Total Number of addresses sequenced=(n)

Array Rows/4 (for Column Oriented data)

Array Columns/4 (for Row Oriented data)

Sequence Values=

0,high(0),1,high(1), . . . n,high(n)

where:

high(n)=(Sensor Rows/4)*(Window Cols/2)+n (col orient)

high(n)=(Window Cols/8)+n (row orient)

5) Row/Column Scan Line Counter (RSLC)—This counter increments each time the window pixel address sequencer generates a terminal count. The term "line" refers to whether subsequent memory locations (the memory line) moves along the Row or Column direction. The formula for the increment value is as follows:

Increment Value=

Sensor Rows/4 (for Column Oriented data)

Sensor Columns/4 (for Non-Interleaved Row Oriented data)

A special case exists for Interleaved Row oriented data in that a sequence must be generated as follows:

Sequence Values=

0,high(0),128,high(1),...n,HIgh(n)

where:

high(n)=(Sensor Rows/2),(Sensor Cols/4)+n

6) FB Word Pixel Offset Value (FBWPOV)—A number in the range of 0 to 3 representing the offset of the first valid pixel from the most significant byte in the first frame buffer (FB) word in the window. This also denotes the last+1 valid pixel from the most significant byte in the last FB word of the window.

7) Total FB Words—This register contains a value corresponding to the total number of Frame Buffer words to be read for the extracted window. The value of this register is determined as follows:

General Formula:

((Scan Lines Size (in Pixels)/4)+1))*(number of scan lines)

Specific Formulas:

For column ordered data:

((array rows/4)+1))*(array cols)

For row ordered data:

((array cols 4)+1))*(array rows)

Example: A 64×96 SIMD

Column Ordered—((96/4)+1)×64)=1600 Total FB words

Row Ordered—((64/4)+1)×96)=1632 Total FB words

Note that one location is added to compensate for the extra word needed in each scan line due to the data being packed in groups of four pixels in the frame buffer and the window base pixel address not falling on an even division of four. In these cases the window offsets cause a fragmented pixel extraction to be required from the first and last FB words in that window thus requiring one more FB word to be read to get all the window pixel data.

Figure 12A:
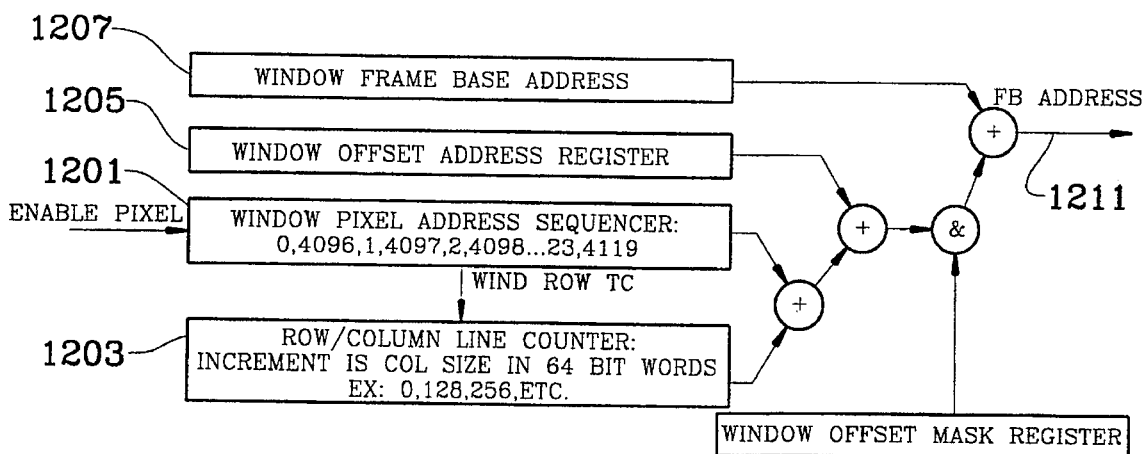
FIGS. 12(a)–(c) illustrate the generation of frame buffer addresses for different data formats in accordance with the invention.
Figure 12B:
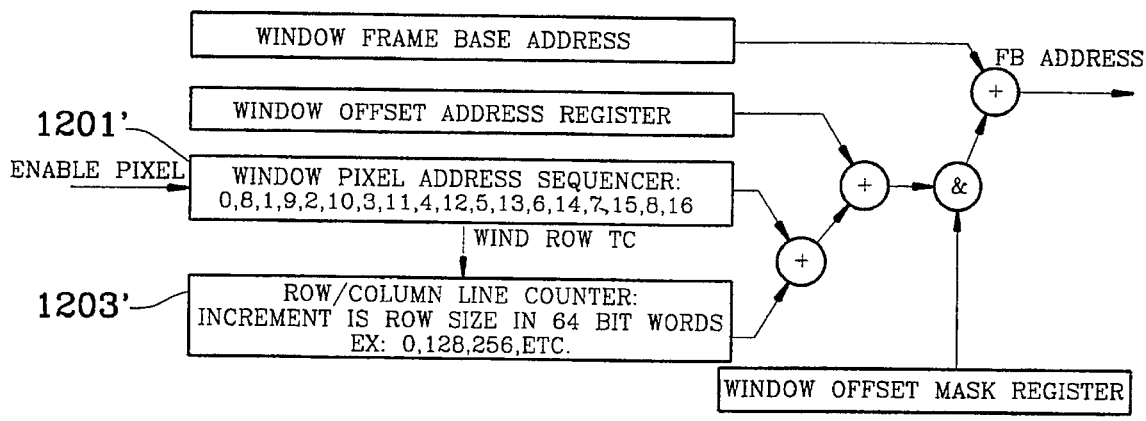
Figure 12C:
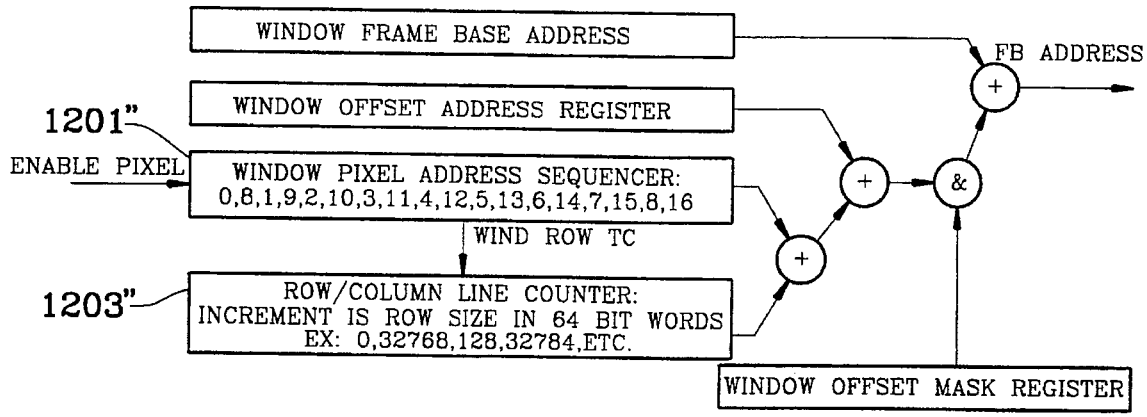

FIGS. 12(a)–(c) illustrate the generation of frame buffer addresses for different data formats. FIG. 12(a) shows a column ordered scan address sequencer. The window pixel address sequencer 1201 forms a count by counting from 0 to 23 and producing an additional interleaved count equivalent to that number plus (total_cols/4)*32. In this example, total_cols=512. The count from 0–23 for a 96 row window for a GAPP IV count would be different for other array row sizes. The row/column line counter 1203 counts in increments of 128 (based on a column size of 512. The value from the window pixel address sequencer 1201 is added to the value from the row/column line counter 1203. This total is added to the output of the window offset address register 1205, and the new total logically AND'ed with the contents of the window offset mask register 1209. This result is then added to the contents of the window frame base address 1207 to produce the frame buffer address 1211.

FIG. 12(b) illustrates a row ordered scan address sequencer. The contents of the various registers are combined in the same way as that described above with respect to FIG. 12(a). However, here the window pixel address sequencer 1201' generates a sequence 0, 8, 1, 9, 2, 10, . . . that is appropriate for row ordered data. Note that in this case, two extra locations are read from the frame buffer 611. This allows buffer logic to account for non-aligned window offsets. These include columns 8 and 16 whereby 8 gets read twice. Again, as to the row/column line counter 1203, the increment of 128 is based on a row size of 512.

FIG. 12(c) illustrates an interleaved row ordered scan address sequencer. Once again, the values from the various registers are combined as described above with respect to FIG. 12(a). However, here both the window pixel address sequencer 1201" and the row/column line counter 1203" generate different sequences, so that the pixel data will be extracted in the proper order. Note that the window pixel address sequencer 1201" causes two extra locations to be read from the frame buffer 611. This allows buffer logic to account for non-aligned window offsets. These include columns 8 and 16 whereby 8 gets read twice. Also, the count in the row/column line counter 1203" is formed by counting from 0 to 95 with the least significant bit as a select to one of two count outputs and the remaining most significant bits as a multiplier for those counts. The formula for the first count is (128*(0..47)) and the second is 32768+(128*(0..47)).

Referring back now to FIG. 7, the window Offset Extractor (WOE) 725 is responsible for extraction of a quad pixel group from frame buffer word pairs, taking into consideration non-aligned window offsets. That is, the frame buffer 611 stores data in clusters of four pixels. Thus, non-aligned window offsets occur when the window offset is not a factor of 4 in the direction (Column or Row) for which that data is stored. This results in a difficult extraction problem that becomes a bottleneck whereby the pixels stored in the frame buffer word must be individually extracted in order to be in the correct format for the Pixel Corner Turn Logic 727 (described below), which requires that input pixels be clustered in two pairs of 64 bit words.

The pixel corner turn logic 727 is responsible for extracting pairs of pixels from the two words (pixel quads) that are extracted by the window offset extractor 725.

As a result of the window address generator 721 generating the appropriate address sequences, the window offset extractor 725 and the pixel corner turn logic 727 select and extract from the frame buffer 611 pixel pairs for 32 bit words in an order such that the pairs can be loaded into the same row and bitplane of the SIMD array. This allows for the system to support a 32 bit IB bus 109.

Figure 13A:
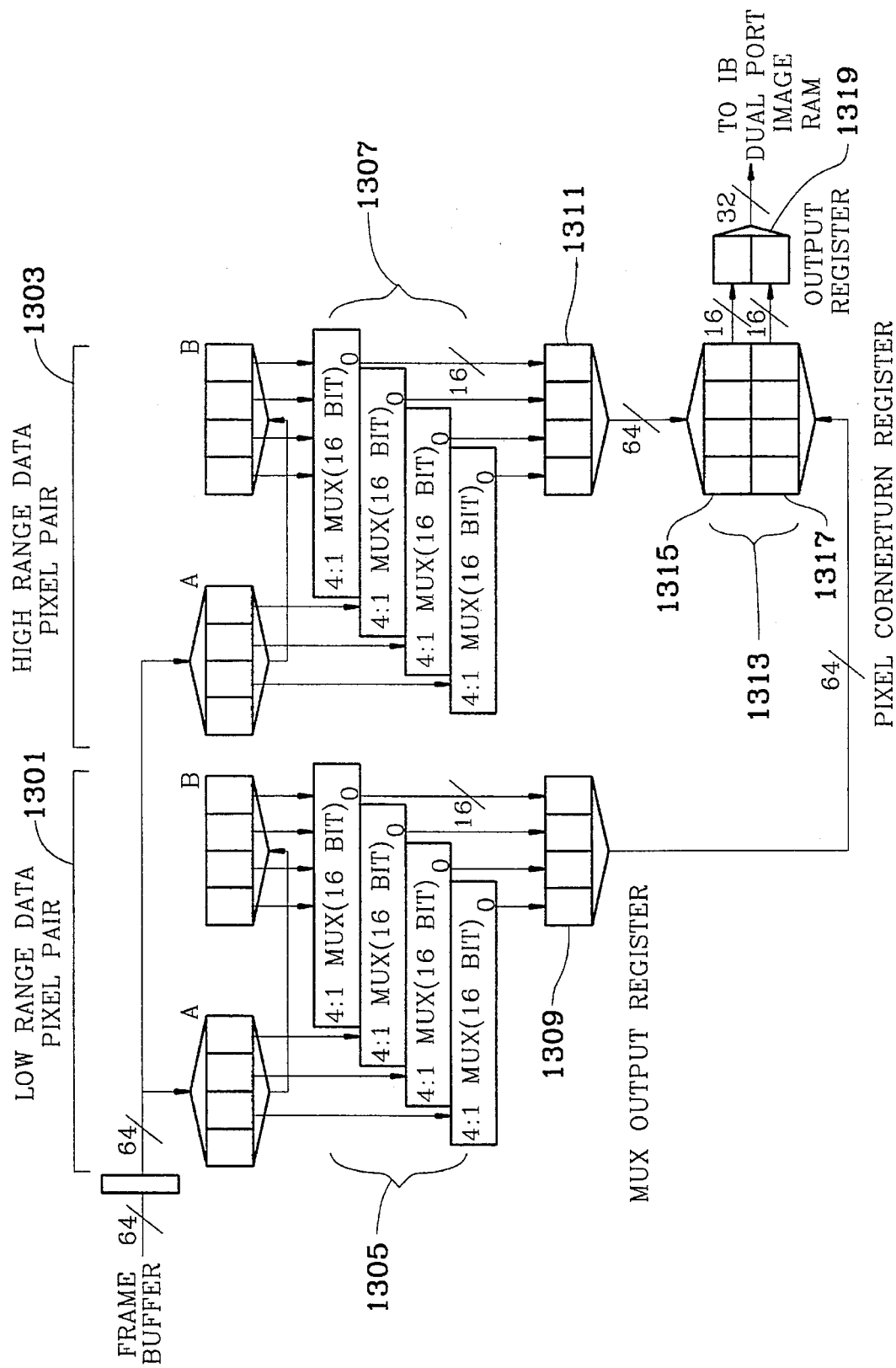

FIGS. 13(a)–(b) show a block diagram and a corresponding timing chart of the register logic used by the window offset extractor 725 and the pixel corner turn logic 727 to perform aligned extraction. The process begins (at times –7, –6, –5 and –4 in FIG. 13(b)) by retrieving 2 pairs of 64 bit words from the frame buffer 611 and storing them into two input word pairs: the low range registers 1301 and high range registers 1303 (individual 16-bit pixels are shown by division lines in the registers). Next these word pairs are then fed to two sets of quad 4:1 pixel multiplexors 1305, 1307. These mulitplexors 1305, 1307 are each 16 bits in size with the multiplexor position select bits (2) driven by the lowest two bits of the window offset value.

On each clock, a pixel quad is extracted from each of the quad 4:1 pixel multiplexors 1305, 1307 and stored into a corresponding one of the Mux Output Registers 1309, 1311. There they are properly aligned to allow the pixel corner turn logic 727 to do its job.

During the same time, two new 64 bit words are read from the frame buffer 611. The previously stored two words are shifted down from the A to the B side of the low and high range registers 1301, 1303, and the new words stored into the A side. The resulting word pairs allow for the extraction of the next aligned data by the quad 4:1 pixel multiplexors 1305, 1307.

At time=–2, the outputs from the mux output registers 1309, 1311 are latched into the pixel cornerturn register 1313, which comprises a high part 1315 and a low part 1317. Then, over the next 5 cycles (time=–1 ... 3), pixel pairs are latched into the output register 1319 from the least significant 16 bits of each of the high and low parts 1315 of the pixel cornerturn register 1313, while at the same time, previously stored values in the output register 1319 are stored into the IB dual port memory 631, and new values are retrieved from the frame buffer 611 and stored into the low and high range registers 1301, 1303 for further pixel corner turning operations.

This process continuous until a complete scan line (row or column) is read from the frame buffer 611 and pixel quads are extracted, turned, and output to the frame buffer. Then the process must begin again for the next scan line.

This process results in only two extra words being read from the frame buffer 611 at the beginning of the selected row (or column). These are read at the beginning of the row (or column) where four words must be read from the frame buffer 611 to get two words out of the window offset extractor 725. From that point on and for the rest of the row (or column), only two words must be read from the frame buffer 611 to get two words out of the window offset extractor 725.

The output data format for the IWX 605 is such that when the IB dual port memory 631 has been filled, the resulting pixel order will be independent of the type of sensor from which it was received. This sensor-independent pattern takes the form of a two dimensional array in the form of (Cols, Rows). This allows for a straightforward sequencing of pixel data to the SIMD array 201, which provides the benefit of a simple address sequencing algorithm for the OWX 613 (described below).

The sensor-independent pattern of data for a 64×96 SIMD array 201 is illustrated in FIG. 14. The format would vary for different array sizes. The total number of IB dual port memory locations needed for storage of an image is as follows:

((array rows)×(array cols))/2

The dual port address generator 723 is responsible for creating address sequences for the IB dual port memory 631. These sequences result in the data being stored into the IB Dual Port memory 631 in the above-described sensor-independent format. This is as a result of the combined actions of the window address generator 721 and the dual port address generator 723.

Figure 15A:
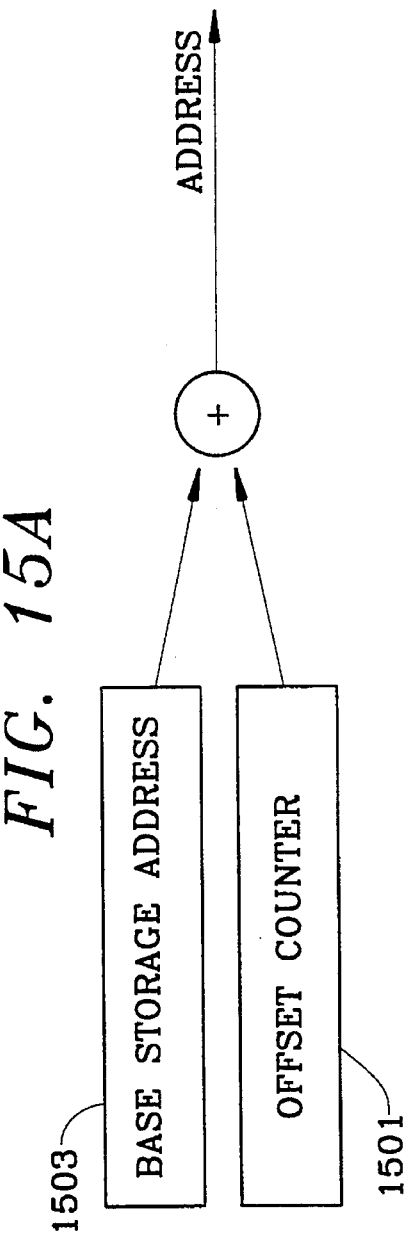
FIGS. 15(a)–(b) show the address sequencing diagrams for the output data sequencing of, respectively, Column oriented and Row oriented sensor data in accordance with the invention.
Figure 15B:
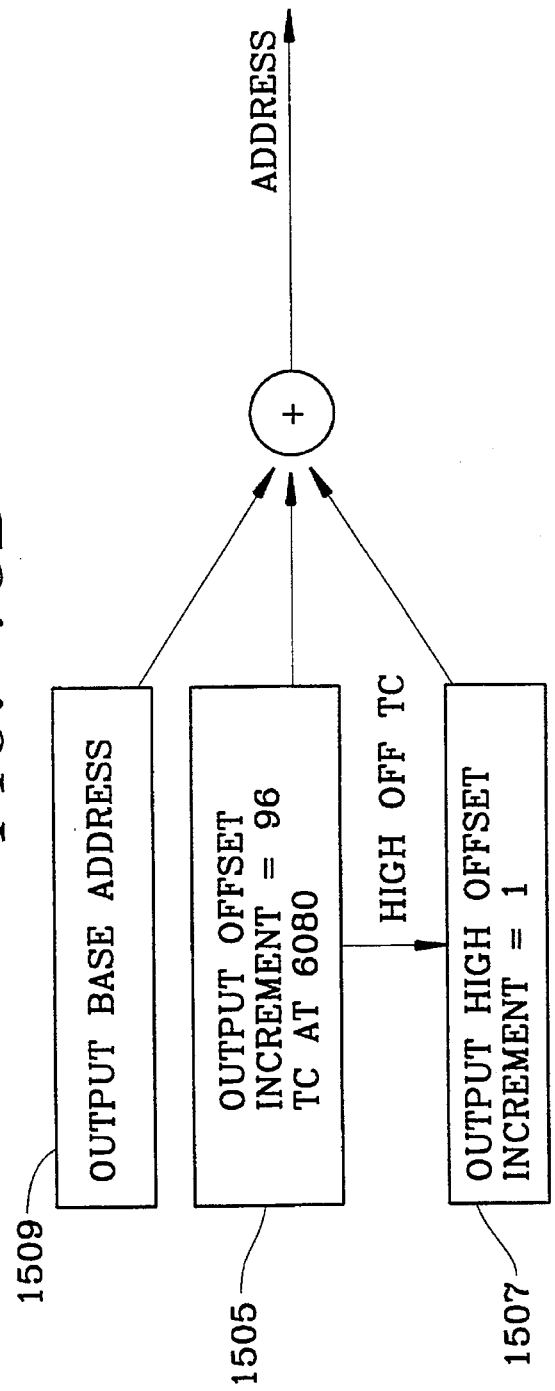

FIGS. 15(a) and 15(b) show the address sequencing diagrams for the output data sequencing of both Column oriented (FIG. 15(a)) and Row oriented (FIG. 15(b)) sensor data. The values indicated are for a 64×96 SIMD array 201.

Referring to FIG. 15(a), the output sequence for Column oriented data is simply a counter 1501 incrementing by 1 for the ((Array Row size)/(Array Column Size)/2)=3072 pixel pairs. The counter value is added to a base storage address 1503 to produce the actual address.

Referring now to FIG. 15(b), the output sequence for Row oriented data is generated by two counters. A first counter 1505 increments by the Column Size 96, incrementing (Row Size/2 –1)=31 times to a count of 2976 at which point a terminal count (TC) is generated so that the count returns to 0 on the next clock. The second counter 1507 increments by one on each terminal count of the first counter 1505 until it reaches a count of Column Size (95). The outputs of the first and second counters 1505, 1507 are added together, along with an output base address 1509 to produce the actual address.

Figure 16:
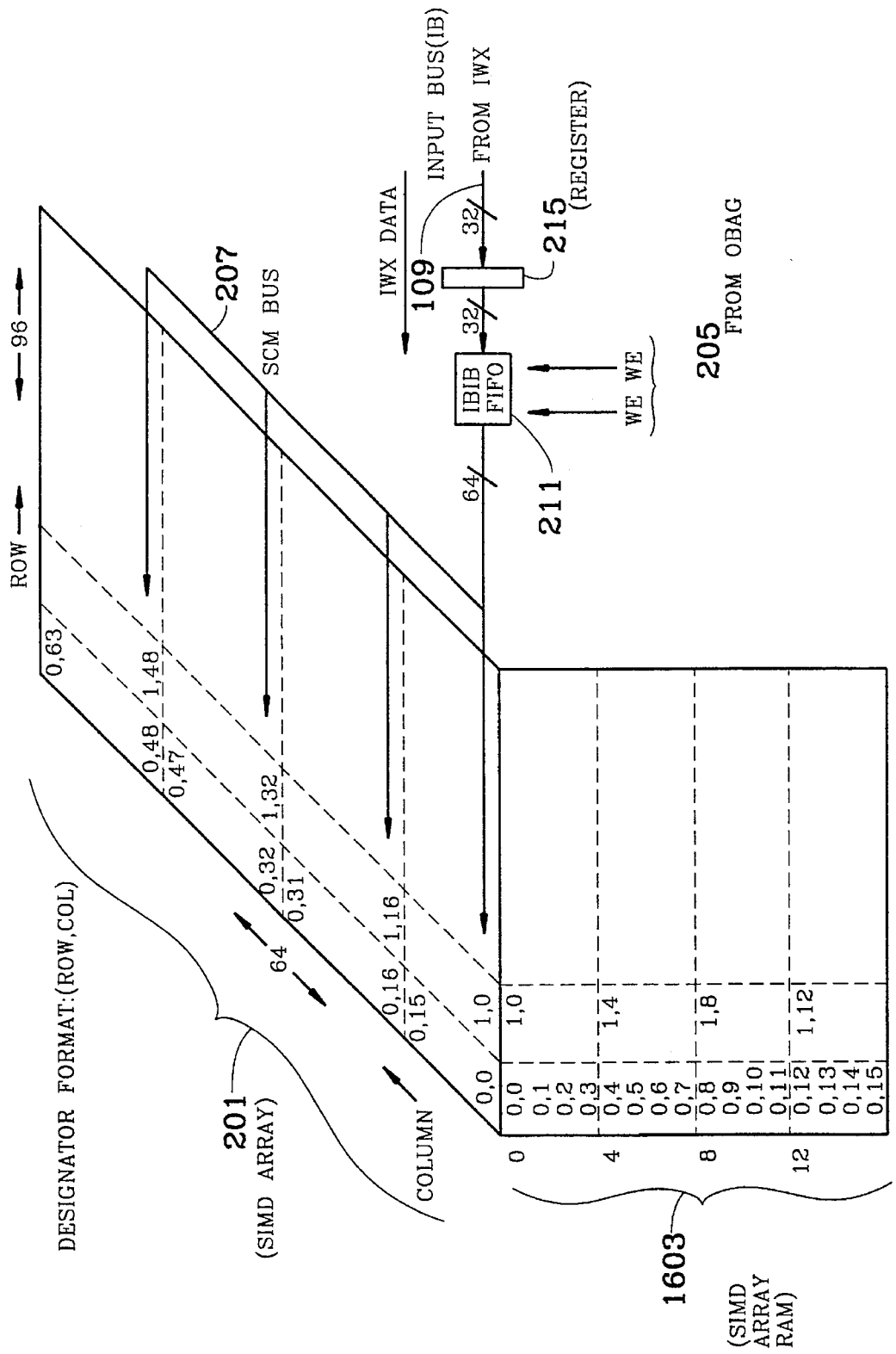
FIG. 16 depicts the flow of a window of data into a SIMD processing array in accordance with the invention.

After a window of image data has been loaded into the IB dual port memory 631, it is next moved into the SIMD array 201 via the IB bus 109. FIG. 16 depicts the flow of this data into the SIMD array. Note that this shows a 64×96 array with a 32 bit IB bus 109 (IB). Two pixels are loaded into a 32 bit register 215 and then into one half of the IBIB FIFO 211. Then, two more pixels are loaded into the register 215 and into the other half of the IBIB FIFO 211. The four pixels (64 bits) are subsequently stored into the SIMD array 201. This sequencing is controlled by the OWX 613 as described below.

The OWX 613 performs address generation and control functions for image data transfers between the IM 103 and the one or more IPMs 107. The OWX 613 also assists in the extraction of target data detected and labelled in the output buffer(s) 203 of the one or more IPMs 107. These functions and supporting hardware will now be described in greater detail.

The OWX 613 provides the necessary signals to transfer image data from the IB dual port memory 631 to the IB bus 109 and to an IPM 107. These signals include IB dual port memory addresses (IB_ADR[15:0]) (in accordance with the sequence fully described above); dual port memory access control signals (e.g., read/write commands: FFOWE* AND FF1WE*); IB bus control signals, including a signal to indicate that an IB bus command value is being read from the IB dual port memory 631 (IB_CMD*) and one to indicate valid image data on the IB bus 109 (IB_VLD*); a "start" signal (IB_RDY*) from the IWX 605 to indicate that a window has just been placed into the IB dual port memory 631.

Figure 17:
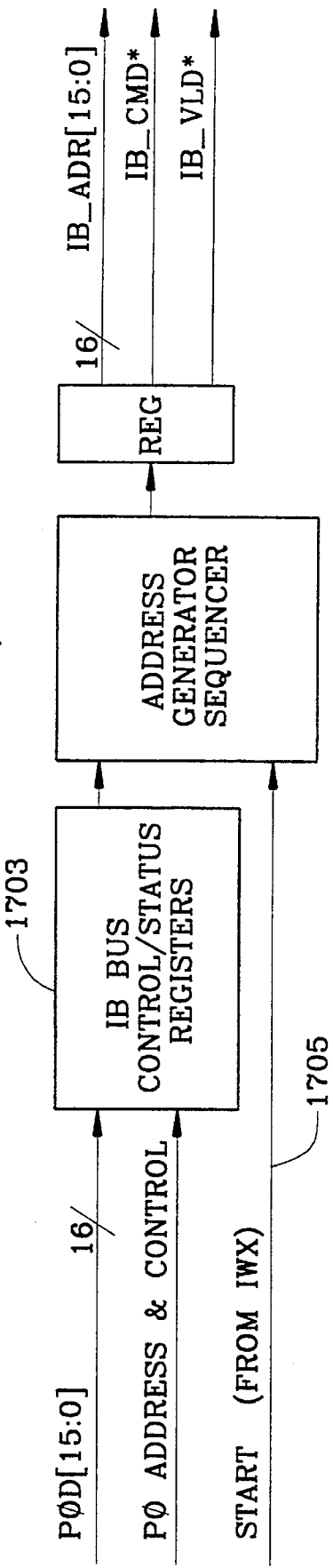
FIG. 17 is a block diagram of an embodiment of an IB bus address generator in accordance with the invention.

Referring now to FIG. 17, the IB bus address generator 1701, which is part of the OWX 613, is shown. The IB bus address generator 1701 is controlled and initialized by the host, which in this instance is the input control processor 607. A host controlled image transfer requires the following steps: 1) The host commands the IWX 605 to place an image into the IB dual port memory 631. 2) Then the host initializes the OWX IB address generator 1701. This initialization includes loading a starting address and other values into the IB bus control status registers 1703. 3) When the IWX 605 has moved the selected image into the IB dual port memory 631, it signals the OWX 613 with the START signal 1705 (also referred to as the IB_RDY* signal). 4) The OWX 613 then begins and completes the image transfer from the IB dual port memory 631 to an IPM 107.

In order to control the generation of IB dual port memory addresses, the OWX 613 preferably includes registers in the IB bus control/status registers 1703 for storing the following information:

1) The IB dual port memory address of the IB bus command value. Each IB dual port memory 631 may contain several address locations that hold an IB bus command for selecting a particular one of several IPMs 107 that is to be the destination of the window data. (This is necessary if the real-time image processor 101 includes more than one IPM 107.) Prior to reading image data from the IB dual port memory 631, the OWX 613 reads the IB dual port memory location designated by this address, and transmits the command (which is an OBAG command, described above) on the IB bus 109. The command value, initialized by the host via the IWX 605, is used to select the receiving IPM 107.

2) The quantity of lines of the image to be transferred. Images transferred to the IPMs 107 are always treated as 16 bit pixel images. Thus, the only variable is the size of the SIMD array 201 that resides on an IPM 107.

3) The start address in the IB dual port memory 631 from which the image is to be moved.

4) Control information for governing moding and initiating IB bus activity.

The OWX provides IB bus status information (bits) indicating operational status, such as: "IB bus armed/busy/complete." Optionally, the OWX may provide the host with an interrupt upon completion of an image transfer. At this point, the host (i.e., the input control processor 607) may send a communication to the IG 105, telling it what algorithm to perform on the downloaded image data. The ability to designate particular algorithms to be performed on particular windows, which may represent only a portion ("subframe") of an entire image provides great processing benefits over other systems which require that the same algorithm be performed on all of the image data of one frame. This is because images may typically consist of highly different types of pixes, such as the case of a sensor looking down range. Pixels at the top of the frame may require a different algorithm than the pixels at the bottom (i.e. close range).

After image data has been downloaded to the one or more IPMs 107 and subsequently processed, it is then necessary to retrieve that processed data from the IPMs 107. This data retrieval takes place via the OB bus 111. Initiated by the host, the OWX 613 gains access to the OB bus 111, and requests data from one of the IPMs 107. The selected IPM 107, in response, transmits data over the OB bus 111. The OWX 613 retrieves the data from the OB bus 111 and stores it into the OB dual port memory 633.

Unlike the IB bus 109, the OB bus 111 may be time shared with another device, such as another IM 103 or a specialized output buffer display module (not shown). Thus the OWX 613 handles the OB bus ownership exchange protocol. An exemplary signal interface is as follows:

| Signal | I/O | Description |
| --- | --- | --- |
| OBA[15:0] | O | OB RAM write address. (0=LSB) |
| OBD[0:15] | I/O | OB data bus. (0=MSB) Bidirectional for command and data transfers. |
| OBD[16:31] | O | OB data bus. (31=LSB) These data signals will be monitored only. |
| OB_CMD* | O | OB command valid. Indicates the OWX 613 is outputting an IPM command value. |
| IMTOOBB* | O | IM to OB bus output enable. Enables the IM's OB bus transceiver 635 to drive the OB bus 111. |
| OB_WR_EN* | O | OB dual port memory write enable. Enables writes to the OB dual port memory 633. |
| OB_VLD* | I | OB data valid. Indicates valid data on the OB bus 111. |
| OB_REQI | I | OB bus request in. OB bus request from a higher priority device. |
| OB_REQO* | O | OB bus request out. Local or passed OB bus request. |
| OB_BSY* | I/O | OB bus busy. Indicates a device owns the OB bus 111. |
| OBTOOWX* |  | OB bus to OWX 613 & OB dual port memory 633 output enable. Enables the transceiver 635 to drive from the OB bus 111 into the IM 103. |
| OB_CS* |  | Chip select for OB dual port memory 633 |

The OWX 613 directly drives and receives the OB bus ownership exchange signals.

As previously stated, the OB bus 111 is bidirectional. The IM 103 transmits commands, and an IPM 107 returns data in response. For loading considerations, a clocked transceiver 635, controlled by the OWX 613, buffers the OWX 613 from the OB bus. As previously described, the OWX 613 transmits commands which select an individual IPM 107 and request output buffer data. This command data is sourced from OWX registers initialized by the host.

The OWX 613 supports two independent host interfaces. A first host interface 645 (see FIG. 6) is used for controlling IB bus operations. A second host interface 647 is used for controlling OB bus operations. The use of two interfaces simplifies host OWX control, because, in the exemplary embodiment, the IM 103 contains two host processors (the input and output control processors 607, 609) which respectively control input and output image movement. (As previously stated, the use of two processors is not essential to the invention. The functions of the two processors could also be performed by one processor.)

The host interfaces 645, 647 provide the host with both read and write access. An exemplary definition of host interface signals is as follows (P0xx corresponds to the first host interface 645; P1xx corresponds to the second host interface 647):

| Signal | I/O | Description |
| --- | --- | --- |
| P0D[15:0] | I/O | Data bus. |
| P0A[2:0] | I | Address bus. |
| P0CS* | I | Chip select. |
| P0STRB* | I | Data strobe. |
| P0RW | I | Read/write. (0=write) |
| P0RDY* | O | Data ready. |
| P0INT* | | Interrupt to host |
| P1D[31:0] | I/O | Data bus. |
| P1A[3:0] | I | Address bus. |
| P1CS* | I | Chip select. |
| P1STRB* | I | Data strobe. |
| P1RW | I | Read/write. (0=write) |
| P1RDY* | O | Data ready. |
| P1INT* | | Interrupt to host |

Figure 18:
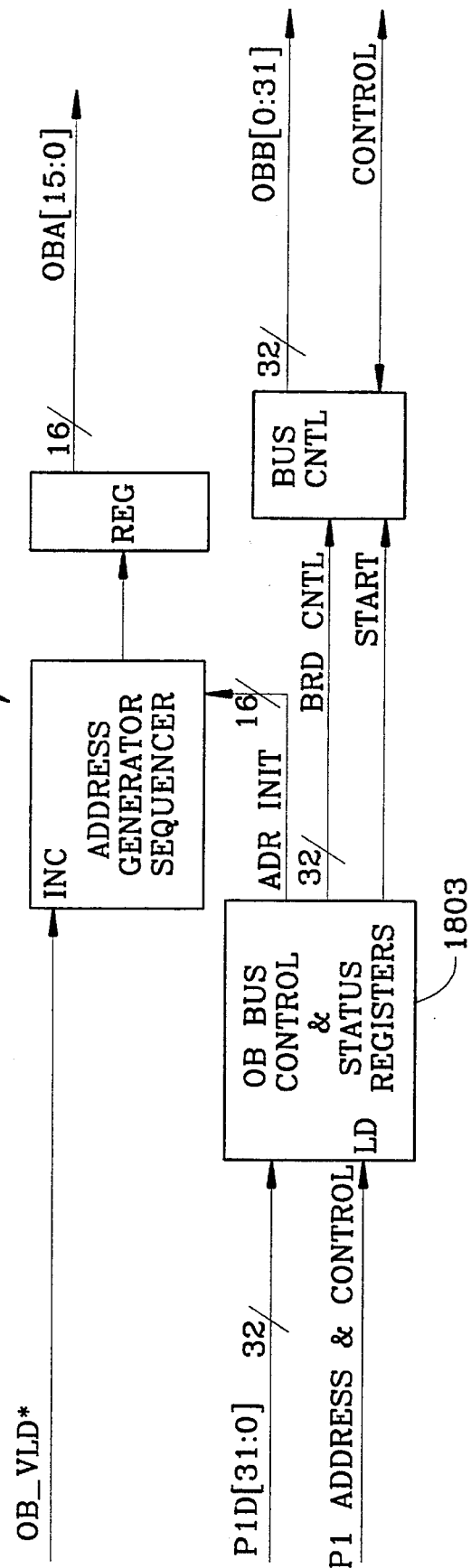
FIG. 18 is a block diagram of an embodiment of the OB address generator in accordance with the invention.

A host controlled image transfer from an IPM 107, then, requires the following steps: 1) The host initializes the OWX OB bus control and status registers 1803. 2) The OWX 613 gains access to the OB bus 111 if required (this would not be necessary if the OWX 613 already obtained and held access during a previous transfer). 3) The OWX 613 transmits command information on the OB bus 111 in order to select which of the one or more IPMs 107 will send data in return. 4) A selected IPM 107 transmits the requested data to the IM 103, where the OWX 613 supplies the OB dual port memory 633 with write addresses. 5) The OWX 613 then notifies the host of transfer completion via status and/or an interrupt. A block diagram of the OB address generator 1801 is shown in FIG. 18.

In the exemplary embodiment, the OWX 613 contains a set of registers, the OB bus control and status registers 1803, for controlling the operation of the OB bus 111. Only one image may be transferred at a time. The OB bus control and status registers 1803 should store at least the following information:

1) OB dual port memory starting address. The OWX 613 writes the received data starting at this address. Successive addresses are generated by incrementing the present address after each write operation. Thus, received data will be written into sequential OB dual port memory 633 locations.

2) Quantity of data to be received or transmitted from the IPM 107. The OWX 613 uses this information to determine when the data transfer from the IPM 107 has completed.

3) Output buffer start address. This address is the absolute start address in the output buffer 203 from which data extraction will begin. The OBAG 205 uses this value when it starts generating output buffer addresses for the requested data transfer.

4) OB bus command data. This includes IPM selection information. The OB bus command data complies with description set forth above with respect to the OBAG 205.

5) Control information for initiating OB bus activity.

6) Hit detector on/off with start and stop parameters. (The hit detector is described below.)

The OWX 613 provides OB bus status information bits that indicate operational status, such as: "OB bus busy/complete", and "next OB address." The OWX 613 may further provide the host with an interrupt upon the completion of an image transfer. The OWX 613 also provides the capability of aborting an image transfer in progress. This is accomplished by asserting the output bus command (OB_CMD*) signal without transmitting a command. An IPM 107 in the process of transmitting a requested data block will abort upon the reception of an OB_CMD*.

Figure 19:
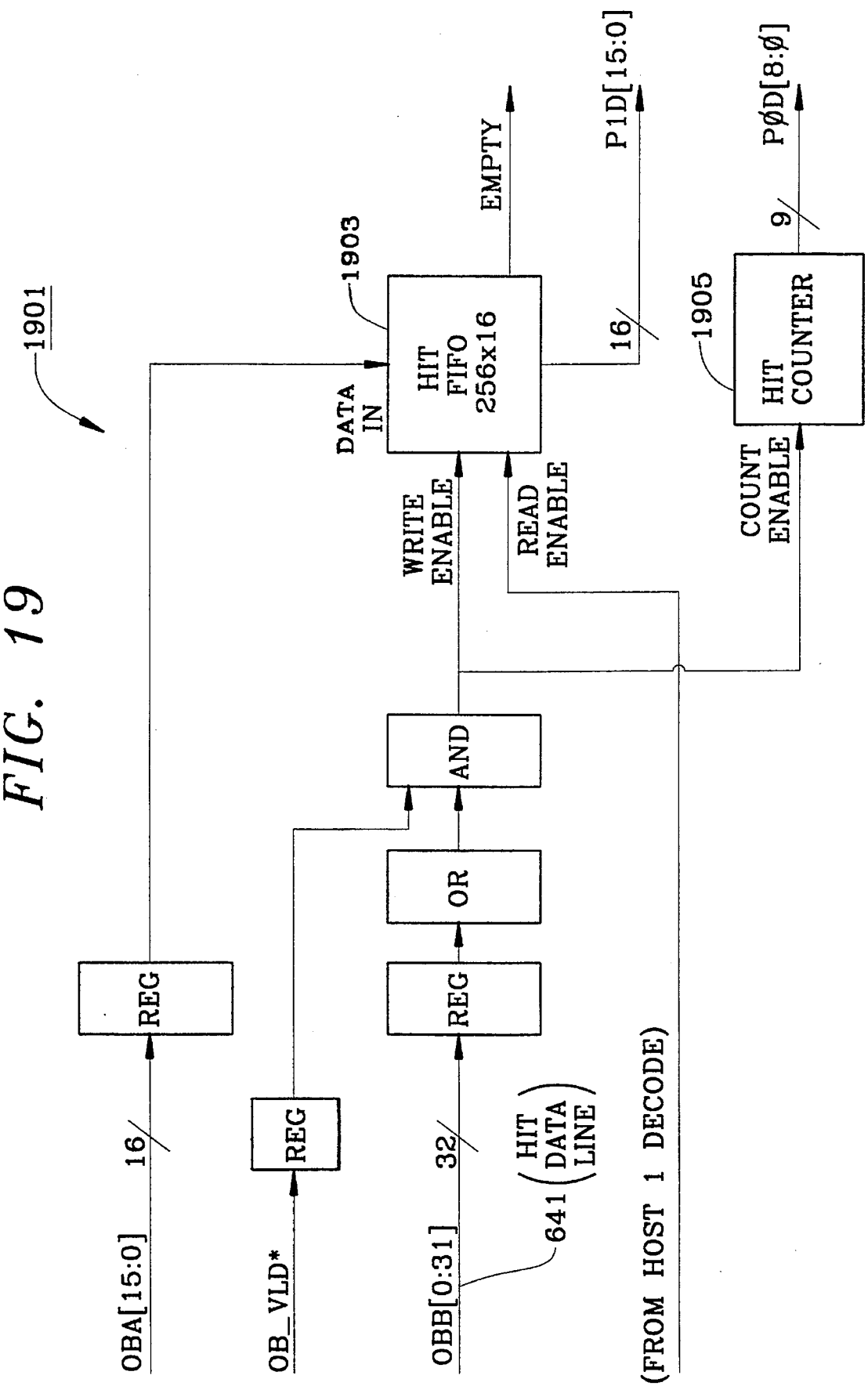
FIG. 19 is a block diagram of hit detection logic in accordance with another aspect of the invention.

Referring now to FIG. 19, and in accordance with another aspect of the invention, a feature called "target hit detection" is provided. Typical operation of the real-time image processor 101 requires the rapid extraction of data from SIMD array processed imagery. Rapid extraction requires efficient identification of the data to be further analyzed and/or extracted from the output buffers 203 of the IPMs 107. The OWX 613 supports this process by providing hit detection logic 1901 which monitors data being received from OB bus 111.

The hit detection logic 1901 relies upon the technique wherein areas of interest within an output buffer image are tagged by setting a corresponding bit in a single output buffer bit plane (i.e., an image with single bit pixels). Areas that are not of interest have their corresponding bits reset to zero. This bit plane is monitored (via the hit data line 641—see FIG. 6) by the hit detection logic 1901 as the bit plane is written into the OB dual port memory 633. The address of any non-zero values is recorded by the hit detection logic 1901 in an internal hit FIFO 1903. Note that a single word upon the OB bus represents 32 pixels of an output buffer image.

To quickly determine which areas of an output image to examine, the host will need only to examine the contents of those locations of the OB dual port memory 633 whose addresses were recorded in the hit FIFO 1903. The hit FIFO 1903 should preferably be capable of storing up to 256 OB dual port memory addresses (corresponding to 256 locations in the OB dual port memory 633 which contain non-zero values). In an alternative embodiment, the hit FIFO 1903 is only 8 bits wide, and stores only the least significant 8 address bits from the OB bus 111. A hit counter 1905, indicating the total quantity of stored addresses, may also be provided for the host to read.

Host control of the hit detection logic 1901 preferably includes at least the following features:

1) The host should be capable of enabling and disabling hit detection operation.

2) The host should be capable of resetting the hit FIFO 1903.

3) The host should be capable of determining the quantity of addresses stored in the hit FIFO 1903 by means of a status read.

Figure 20:
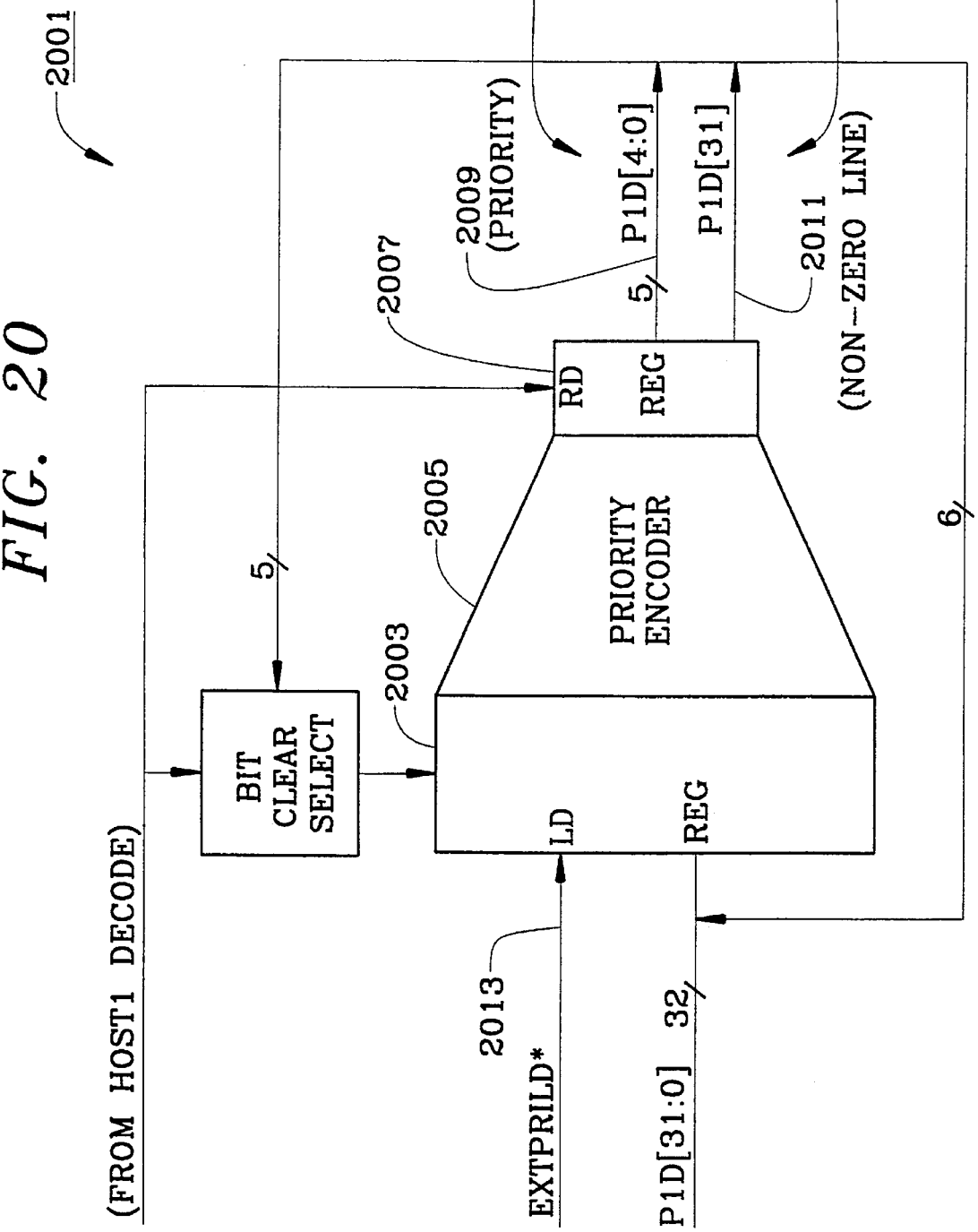
FIG. 20 is a block diagram of bit extraction logic in accordance with another aspect of the invention.

Referring now to FIG. 20, and in accordance with yet another aspect of the invention, the contents of each recorded (in the hit FIFO 1903) OB dual port memory 633 location may further be reduced by using the OWX's bit extraction logic 2001. While the hit detection logic 1901 reduces the quantity of addresses that must be evaluated for possible targets, the bit extraction logic 2001 further reduces the host's task of data analysis. As noted above, each location of the OB dual port memory 633 holds the target information for 32 image pixels. Rather than test each individual bit location, the bit extraction logic 2001 priority encodes the position of every set bit within a 32-bit word. The 32-bit value is clocked into the register 2003 as it is being read from the OB dual port memory 633. A priority encoder 2005 ascertains the bit position of the most significant bit that is set to a "1". This value is encoded in five bits and loaded into a second register 2007, along with an extra bit that indicates whether the entire 32-bit value is non-zero. The register thus provides a priority line 2009 and a non-zero line, both of which can be read by the host processor. Furthermore, each subsequent read from the bit extraction logic 2001 clears the highest priority set bit, thereby allowing the bit extraction circuit to find the next highest priority set bit. Bit 31 of the host interface will become set to a "1" when no set bits are left.

When the output control processor 609 reads the OB dual port memory 633 with the non-zero value (i.e., the hit locations), the OWX 613 may latch the value as it is being read. This is done by asserting the EXTPRILD* signal 2013 to the OWX 613. This loads the value on the host interface into the priority encoder register 2003. The EXTPRILD* signal 2013 may be generated by a simple address decode that also accessed the OB dual port memory 633. The priority encoder register 2003 may also be accessed directly by the output control processor 609 as a read/write register.

Figure 21A:
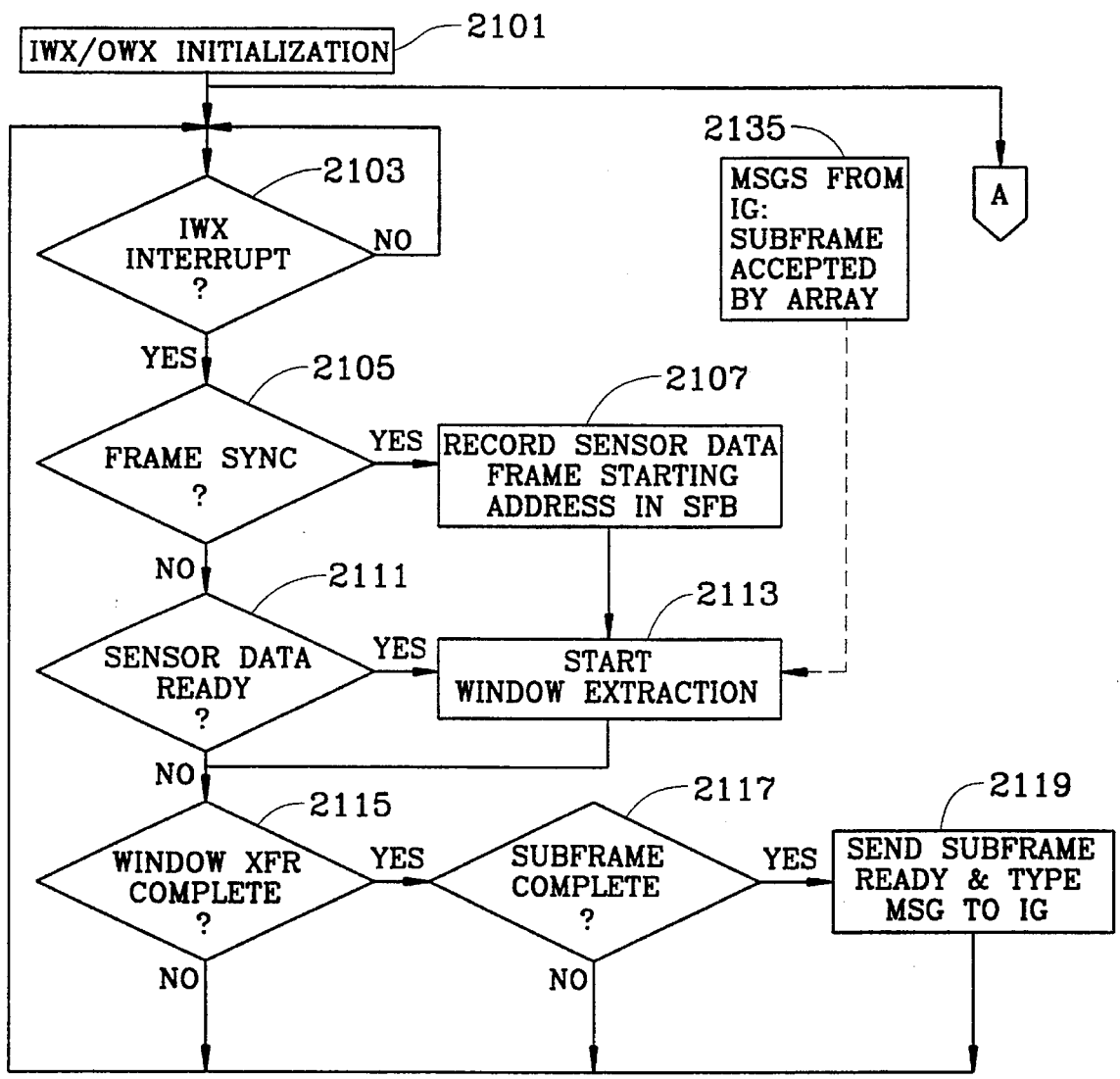
FIGS. 21(a)–(b) are a flow chart depicting the operation of the input control processor and the output control processor in accordance with the invention.
Figure 21B:
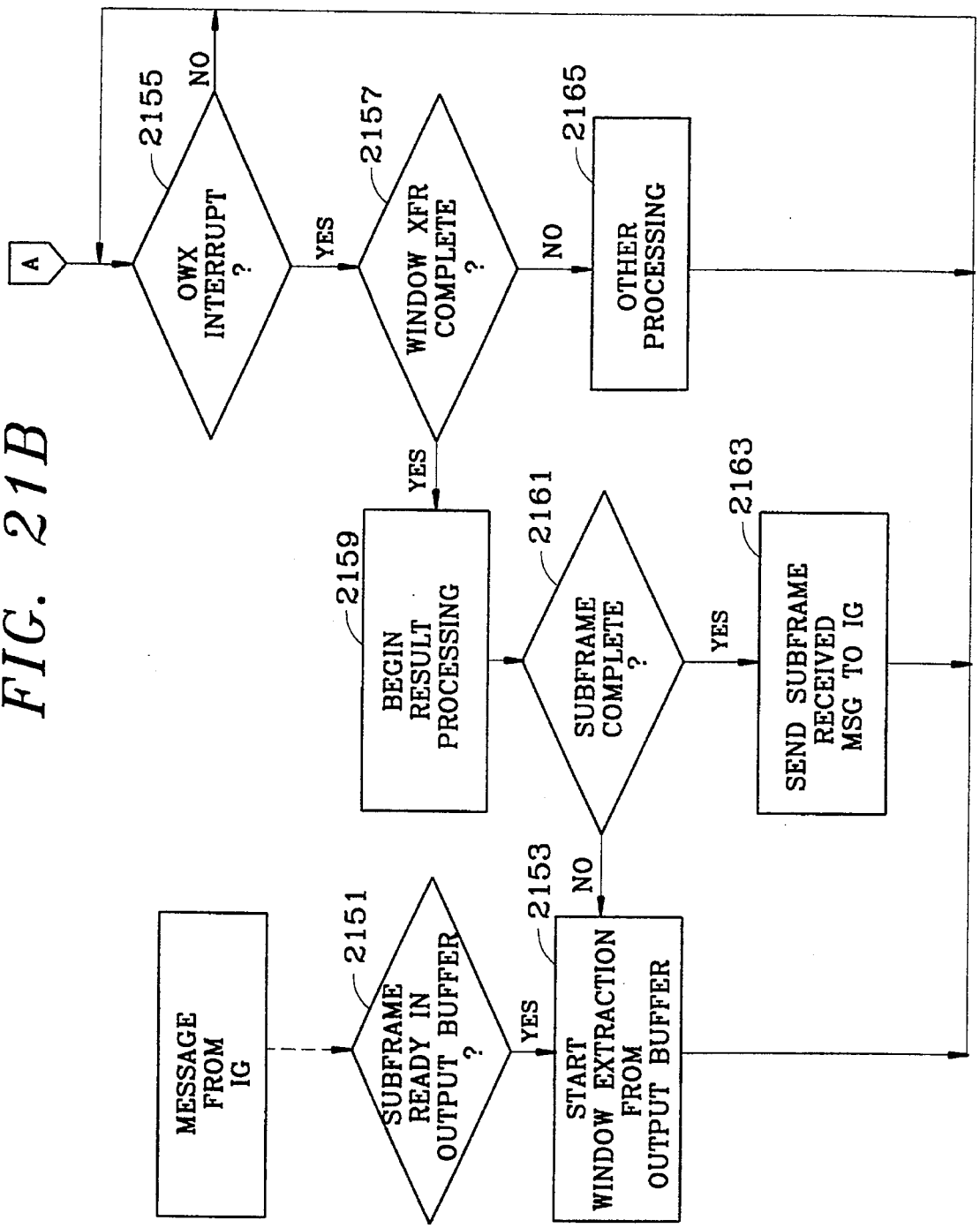
Figure 22:
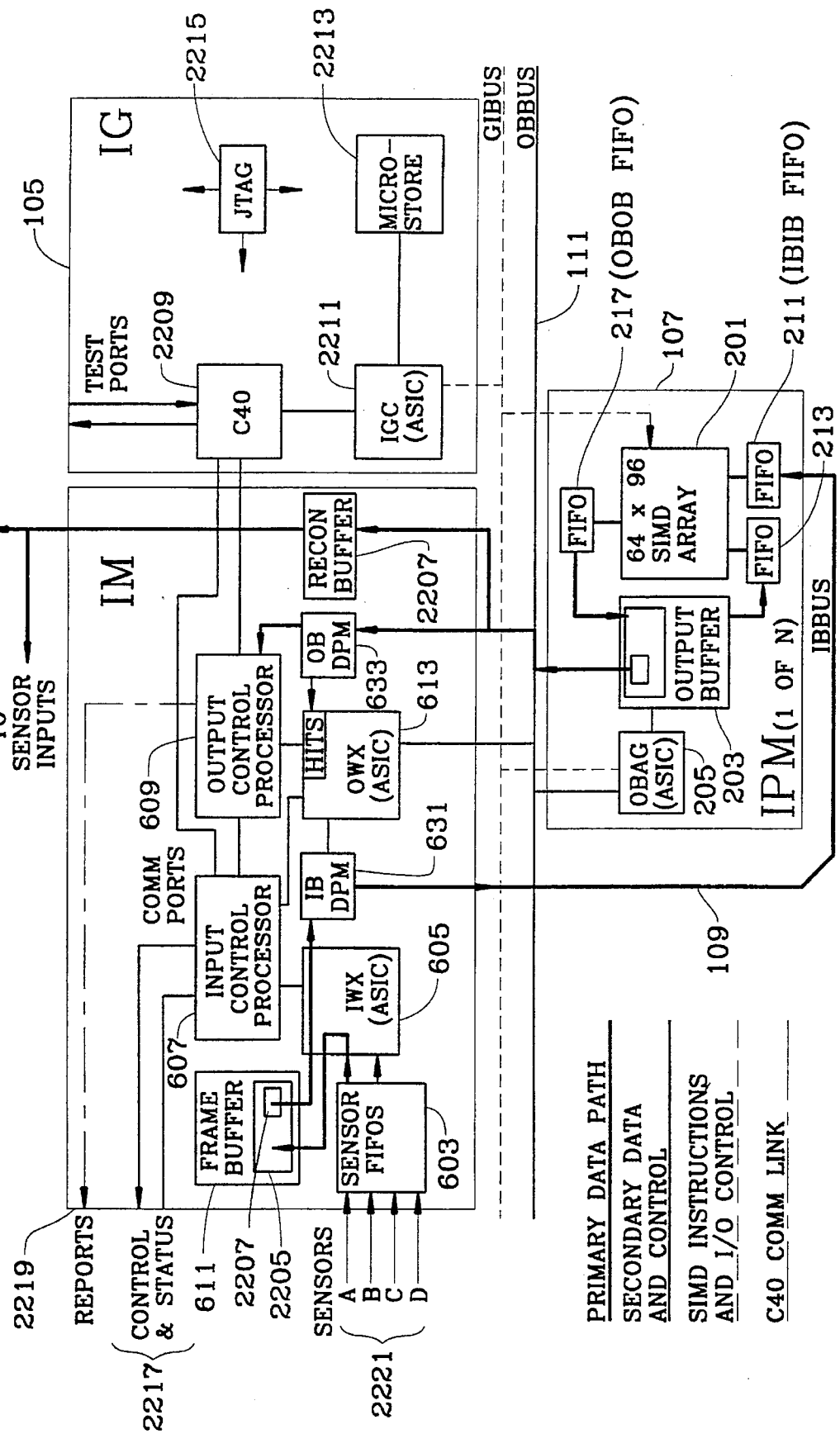
FIG. 22 is a block diagram depicting an exemplary data flow within the real-time image processor in accordance with the invention.

The operation of the input control processor 607 and the output control processor 609 will now be described with reference to the flow chart of FIGS. 21(a)–(b), and the diagram of data flow within the real-time image processor 101 depicted in FIG. 22. While the flow chart depicts operations being allocated between two independently operating processors, it will be readily apparent to one having ordinary skill in the art that these teachings can be adapted to be performed by a single processor that performs the tasks of the input and output control processors 607, 613.

Both processors begin at step 2101 by performing necessary initialization of the IWX 605 and the OWX 613, in accordance with the requirements specified above. It is assumed, for this discussion, that this initialization includes enabling the IWX 605 to begin receiving data from one of the sensor ports 601 (the IWX 2201 controls the movement of sensor data from the sensor FIFOs 2203 to an allocated portion of the frame buffer 2205). The artificial limitation of receiving data from just one sensor makes the operation of the real-time image processor 101 easier to explain. It is a simple matter for one of ordinary skill in this art to extend the teachings here to cover situations in which data may be received from multiple asynchronously operating sensors.

After execution of step 2101, the operations of the two control processors diverge: operations of the input control processor 607 continue at step 2103, while operations of the output control processor 609 continue at step 2151.

Continuing with the operations of the input control processor 607, at step 2103 a check is performed to see whether an interrupt has been received from the IWX 605. If no interrupt has been received then processing continues by looping back to repeat step 2103.

If an interrupt has been received from the IWX 605, the input control processor 607 checks to see what type of interrupt it is. At step 2105, a test is performed to see if the received interrupt is a frame sync interrupt, indicating that a pixel accompanied by a frame sync signal has been received from a sensor. If it is not, processing continues at step 2111. However, if a frame sync was received, processing continues at step 2107, where the starting address (in the sensor frame buffer 611) for this pixel is recorded. It will be recalled that the data for each of the sensors is stored in a rotating buffer 2205 that has been allocated within the sensor frame buffer 611, and that the location of the first pixel in a frame may by dynamically changing, depending on the relationship between the size of the frame and the size of the allocated buffer. Thus, it is important that the input control processor keep track of the present location of the start of the incoming frame.

Next, at step 2113, the input control processor 607 takes the necessary steps to cause a window of data to be moved from the frame buffer 611 to one of the IPMs 107 for processing. This is done in recognition of the fact that if a frame sync was just received, then receipt of the data for the previous frame 2207 has now been completed. This data (from the previous frame 2207) must be moved out of its allocated portion of the frame buffer 611 and into the IB dual port memory 631 before it is overwritten by newer data. To effect this window extraction, the input control processor first checks to see whether a message has been received from the IG 103 (see step 2135) saying that a previous subframe has been moved from the IBIB FIFO 211 into the SIMD array 201 (i.e., the "subframe accepted by array" message). An affirmative answer indicates that there is space in the IBIB FIFO 211 for more data, and the input control processor 607 can continue. The input control processor then initializes the IWX 605 to begin moving the window of data from the frame buffer 611 to the IB dual port memory 631, and also initializes the OWX 613 so that it will be able to move that window of data from the IB dual port memory 631 to the IBIB FIFO 211. (The OWX 613 will begin doing this in response to a start signal received from the IWX 605.)

Processing within the input control processor 607 then continues at step 2115. Since the input control processor 607 has just started the extraction of one window, it is unlikely that the test at step 2115 will be satisfied, and control returns to step 2103 to wait for another IWX interrupt.

If the size of one frame of sensor data is equal to the size of a window (which is equal to the size of the SIMD array 201 on one IPM 107), then it is sufficient to extract a window from the frame buffer 611 only whenever a frame sync interrupt is received. However, if the size of a frame is larger than the size of a window, then another way of scheduling the extraction of these windows must be provided. In FIG. 21(a), this is shown as step 2111, which checks to see whether the interrupt indicates sensor data ready. This is an interrupt that the input control processor 607 can schedule by initializing pixel quantity values that will be compared against the actual number of pixels (for a given sensor) received by the IWX 605. When the quantities are equal, the IWX 605 will issue the sensor data ready interrupt, to tell the input control processor 607 that another window of data has been received and should be extracted (even if the last pixel for the current frame has not yet been received). If the input control processor 607 detects, at step 2111, that a sensor data ready interrupt has been received, then processing continues at step 2113 as described above.

If the real-time image processor 101 includes more than one IPM 107, then processing of the data normally cannot begin until a window of data has been moved to each one of the SIMD arrays 201. Thus, it may be necessary for the IM 103 to move a plurality of windows to the IPM 107 before the IPM 107 can begin processing the data. It is worth noting, at this point that the number of windows required to fill all of the IPMs 107 in the real-time image processor 101 may still only constitute a sub-frame of data, that is, less than the amount of data that makes up one frame of data for a given sensor. For this reason, the rest of this discussion uses the term "sub-frame." It will be recognized, however, that if the size of the combined SIMD arrays 201 is equal to a sensor frame size, then the "sub-frame" in this case is equal to a frame.

To make sure that IPM processing does not begin until an entire subframe of data has been downloaded to all of the IPMs 107, the IWX 605 issues an interrupt when it has completed moving one window of data from the frame buffer 611 to the IB dual port memory 631. (At this point, the IWX 605 also sends a start signal to the OWX 613, which immediately responds by moving the data from the IB dual port memory 631 to the designated one of the IPMs 107.) The input control processor 607 detects the occurrence of the IWX's "window transfer complete" interrupt at step 2115, and continues processing at step 2117. Here, a check is performed to determine whether an entire subframe's worth of windows has been moved to the IPMs 107. If the answer is no, then processing continues back at step 2103. The next window extraction will be started when either of the frame sync or sensor data ready interrupts occur (detected at steps 2105 or 2111).

If, however, the test at step 2117 indicates that an entire subframe's worth of data has been moved to the IPMs 107, then it is time to cause the IPMs 107 to begin the processing of that data. Therefore, at this point the input control processor 607 sends a "subframe ready" message to the IG, along with an indication of what type of sensor the data was received from, and a designator of what algorithm is to be performed on this data.

In response to receipt of the "subframe ready" message and accompanying information, the IG 105 begins sending out instructions on the GI bus 113 which are distributed to all of the IPMs 107. Initially, these instructions cause the subframe of data, presently residing in the IBIB FIFOs 211, to be moved into the SIMD arrays 201. When this task is complete, the IG 105 sends the above-described "subframe accepted by array" message to the input control processor 607, so that the input control processor 607 will know that there is now room in the IBIB FIFOs 211 for more data (see step 2113 above). Next, the IG 105 generates and sends a series of instructions to the IPMs 107 to effect processing of the data. Such processing may include the movement of intermediate results into the output buffer 203, and then back into the SIMD array 201 (via the OBIB FIFO 213).

When processing of the subframe is finally completed, the IG 105 ensures that the processed data is moved from the SIMD arrays 201 to the corresponding output buffers 203. At this point, the IG 103 sends a "subframe ready in output buffer" message to the output control processor 609, so that the data can be moved from the IPMs 107 back to the IM 103.

Referring now to FIG. 21(*b*), receipt of a message on the communication port causes the output control processor 609 to determine what type of message it is. At step 2151, the output control processor 609 tests to determine whether the received message was a "subframe ready in output buffer" message. If yes, then at step 2153 the output control processor 609 takes the necessary actions to cause the subframe to be moved back into the IM 103, one window at a time (in case the system includes more than one IPM 107). These actions include setting up the necessary parameters in the OWX 613 (e.g., how much data and where it is located, and where it should be stored) to cause it to move a window of data from each output buffer 203 into a location in the OB dual port memory 633. The output control processor 609 must then wait for interrupts from the now autonomously operating OWX 613.

At step 2155, the output control processor 609 waits for an interrupt from the OWX 613. When one is received, the type of interrupt is tested to determine whether the OWX 613 has completed the transfer of one window from an output buffer 203 to the OB dual port memory 633. If not, then processing continues at step 2165, where other processing is performed, which may include error processing if no other type of interrupt was expected.

If this is a "window transfer complete" interrupt, then at step 2159 the output control processor performs application-specific processing on the received window of data. Such processing may include, for example, checking the addresses stored in the hit detection logic 1901, if such logic was enabled during the movement of the window from the output buffer 203 to the OB dual port memory 633.

Next, at step 2161, the output control processor determines whether it has received all of the windows that constitute the expected subframe of processed data. If not, then processing continues at step 2153, where the necessary actions are taken to extract another window of processed data from another one of the output buffers 203. These actions are described above with respect to step 2153.

If, at step 2161, the output control processor ascertains that a complete subframe of processed data has been received from the IPMs 107, then it sends a "subframe received" message to the IG 105. Upon receipt of this message, the IG 105 will de-allocate the space in the output buffers 203 for later reuse.

Processing of data in the real-time image processor 101 continues, then, with the input control processor 607 controlling the movement of data subframes to the IPMs 107 and also designating the type of processing to be performed on those subframes, the IG 105 asynchronously generating the low-level instructions that cause the IPMs 107 to effect the desired processing, and the output control processor 609 retrieving the processed subframes from the IPMs 107 in order to make room for more raw data to be processed.

It was stated above that the output control processor 609 may perform some post-processing operations on the processed data retrieved from the IPMs 107. In accordance with another aspect of the invention, this processing includes the use of a reconstruction buffer 2207. To understand the desirability of this feature, one needs to recognize the fact that, in general, the IPMs 107 are processing only a portion of one frame's worth of data (i.e., a subframe) at any one time. Thus, a complete processed image must be reconstructed from separately processed sub-images. The reconstruction buffer 2207 is the receptacle for a complete processed image. The output control processor 609 keeps track of where each subframe of processed data (and each pixel within that subframe) should be placed in the reconstruction buffer 2207 in order to ensure that an entire processed image is constructed from the separately processed subframes of data.

Another problem associated with image reconstruction is solved in accordance with yet another aspect of the invention. Here, it is recognized that the processing of a frame of data is broken up into separately performed processings of subframes, and that for proper processing, the pixels located along the edges of the subframe must often be repeated at corresponding edge points of adjacent subframes. That is, each subframe is not a wholly distinct entity, but rather has regions along its borders that overlap corresponding regions of adjacent subframes. The output control processor 609 of the present invention is capable of determining these regions of overlap, and eliminating redundant pixels before placing a processed subframe into the reconstruction buffer 2207.

The output of the reconstruction buffer 2207 may be supplied to any other device as may be required by the particular application, such as display or mass storage devices. Furthermore, because the reconstruction buffer 2207 holds pixels in an arrangement that is equivalent to that which would be produced by a sensor (e.g. Row or Column oriented), the output of the reconstruction buffer can be supplied to one of the sensor inputs, so that further processing of the processed image can be performed by the IPMs 107. This may be desirable, for example, where further processing of areas of interest is to be performed, such as where a first pass at image processing locates areas of interest (assuming that the image size is large compared to the size of the SIMD array 201). During a second pass (using only processed data), only the windows of interest would be processed.

A great advantage provided by the invention is the fact that processing need not be performed on an image (i.e., a frame) as a whole, but may be performed separately on individual subframes of the image. This means that processing of an image can begin as soon as a subframe's worth of data has been collected; one need not wait until the sensor has provided data constituting an entire image. Furthermore, one may tailor the algorithm to be applied on the basis of what part of an image a subframe comes from (e.g., top of image versus bottom of image). In the prior art, in which the entire image is loaded into a SIMD array from processing, it was either necessary to compromise by performing the same algorithm over an entire image, or else conditional logic had to be built into the algorithm itself to process different parts of the image differently. This latter approach slows down the effective processing rate of such a processor.

Furthermore, the ability to send individual windows to a plurality of IPMs 107 allows processing to be performed only on particular areas known to be of interest. Such might be the case, for example, where a first pass at processing a large (compared to the size of a subframe) image identifies pixels of interest. A subsequent pass need not include sending windows of data to the IPM 107 for processing, if those windows do not contain any pixels of interest.

Another advantage of the present invention is its expandability. The size of the processing array may easily be expanded by adding more IPMs 107 into the system.

Image processing is a dynamic and relatively immature science. Significant algorithm advances are achieved frequently within this highly inventive and interactive community. To benefit from algorithm advances with the lowest life cycle costs, a programmable architecture, such as that disclosed here, is the most desirable. To overcome the traditional difficulty in programming such supercomputers, the invention further teaches a relatively easy and efficient environment for program development.

The real-time image processor 101 is programmable at several different levels. At the highest level, the Khoros Cantata visual programming environment is used to specify complete algorithm suites from libraries of low-level image processing primitives. The glyph icons that Khoros Cantata uses to represent each algorithm primitive component of the full algorithm suite are normally executed by a Unix workstation processor. However, during algorithm and software development, the real-time image processor 101 can be interfaced to the Unix workstation host as an image coprocessor, and all or portions of the algorithm suite are then sent to the real-time image processor 101 for execution. The control and status lines 2217, report line 2219, and sensor inputs 2221 would be used as an interface in such a case. The X-Windows Unix host operating system supports a mouse, pull-down menu, and point-and-click user interface that is used to define complete algorithm suite specifications on the Cantata data flow graph style workspace. All the standard Khoros image processing algorithms primitives may be executed either on the Unix host processor or the real-time image processor 101 hardware (acting as a coprocessor). The real-time image processor high-level visual programming environment allows many algorithm suites to be developed, evaluated, and loaded into embedded real-time image processor systems very rapidly and with very low development costs.

At the next level down, real-time image processor algorithm software development is supported by C++ and Ada compilers. The C++ and Ada software development environments are hosted on standard Unix host workstation platforms and include a full set of programming tools to express, complete, link, download, execute, debut, and evaluate new algorithm software components. Image display, pixel editing, and performance profiling tools are also available. Debug may be accomplished on a Sun-hosted high-fidelity real-time image processor emulator, or directly on the hardware of the real-time image processor 101. Symbolic image data type definitions are supported by the real-time image processor C++ and Ada compilers so that the programmer need only reference a single symbolic image data structure in specifying full image algorithm operations.

At the lowest level, support is provided for microcoding new primitives that will be recognized and executed by the IGC 2211 on the IG 105. Microcoded primitives are expanded at run time by the IGC 2211. A full set of primitives that efficiently supports most image processing applications has already been created and are the primitives from which C++ and Ada HOL algorithms are normally built.

Algorithm software created in the real-time image processor development environment may be downloaded for execution in embedded applications, or used to augment the Khoros visual programming algorithm library. Full Ada validation requires the algorithm source code, written in Ada, to be target (via Ada compilation and link) to the processor (IG's first processor 2209) on which the code is to be executed. It is not sufficient to implement a real-time image processor assembler in Ada, which then generates executable SIMD microcode at compile time.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. An image processor comprising:

image processing means for processing a subframe of a sensor image in accordance with image processing commands, the subframe constituting a predetermined quantity of sensor data, and the processing including at least one of non-data movement analysis and modification of the subframe of the sensor image;

an instruction generator for generating the image processing commands in response to receipt of a message including a subframe ready indicator and an algorithm designator, the image processing commands being determined by the algorithm designator;

an image manager, coupled to the image processing means and the instruction generator means, and having an input for receiving a stream of sensor data constituting an image frame, the image frame comprising at least one subframe, wherein the image manager detects receipt of a subframe of sensor data, and in response thereto sends the subframe of sensor data to the image processing means, and sends a message to the instruction generator, the message comprising the subframe ready indicator, and the algorithm designator.

2. The image processor of claim 1, wherein:

in response to generating a final image processing command, the instruction generator sends a completion message to the image manager; and in response to receipt of the completion message, the image manager retrieves a processed subframe from the image processing means.

3. The image processor of claim 2, wherein the image manager further comprises:

an addressable output memory having output memory locations for storing the processed subframe; and hit detection logic for monitoring the processed subframe as it is being stored into the output memory, and for indicating output memory addresses of only those output memory locations into which were stored any of a plurality of predetermined data values.

4. The image processor of claim 3, wherein the image manager further comprises bit extraction logic for receiving a multi-bit data value that is stored in a location of the output memory and for indicating a bit position of a most significant bit having a predetermined value in the multi-bit data value.

5. The image processor of claim 2, wherein:

the image manager further comprises a reconstruction buffer; and the image manager places the processed subframe in a location of the reconstruction buffer in correspondence with a location that the subframe of sensor dam, from which the processed data was derived, corresponds to.

6. The image processor of claim 5, wherein the image manager, prior to placing the processed subframe into the reconstruction buffer, eliminates redundant pixels that were previously stored in the reconstruction buffer in connection with a previous processed subframe.

* * * * *

UNITED STATES PATENT AND TRADEMARK OFFICE
CERTIFICATE OF CORRECTION

PATENT NO. : 5,606,707

DATED : February 25, 1997

INVENTOR(S) : Tomassi et al.

It is certified that error appears in the above-indentified patent and that said Letters Patent is hereby corrected as shown below:

At column 27, line 60, please amend "(Sensor Rows/2), (Sensor Cols/4)" to --(Sensor Rows/2)*(Sensor Cols/4)--.

Signed and Sealed this

Twenty-seventh Day of May, 1997

*Attest:*

BRUCE LEHMAN

*Attesting Officer*      *Commissioner of Patents and Trademarks*